United States Patent [19]

Beardsley et al.

[11] Patent Number: 5,636,359
[45] Date of Patent: Jun. 3, 1997

[54] PERFORMANCE ENHANCEMENT SYSTEM AND METHOD FOR A HIERARCHICAL DATA CACHE USING A RAID PARITY SCHEME

[75] Inventors: Brent C. Beardsley; Joel H. Cord; Joseph S. Hyde, II; Vernon J. Legvold; Carol S. Michod, all of Tucson, Ariz.; Gary E. Morain; Chan Y. Ng, both of San Jose, Calif.; John R. Paveza, Morgan Hill, Calif.; Lloyd R. Shipman, Jr., San Jose, Calif.

[73] Assignee: International Business Machines Corporation, Armonk, N.Y.

[21] Appl. No.: 262,208

[22] Filed: Jun. 20, 1994

[51] Int. Cl.$^6$ .................................................. G06F 12/08
[52] U.S. Cl. ............................................ 395/449; 395/471
[58] Field of Search ................................. 395/800, 441, 395/449, 471

[56] References Cited

U.S. PATENT DOCUMENTS

| | | | |
|---|---|---|---|
| 4,636,946 | 1/1987 | Hartung et al. | 364/200 |
| 4,669,043 | 5/1987 | Kaplinsky | 395/800 |
| 4,819,159 | 4/1989 | Shipley et al. | 364/200 |
| 4,835,686 | 5/1989 | Furuya | 395/463 |
| 4,875,155 | 10/1989 | Iskiyan et al. | 364/200 |
| 4,916,605 | 4/1990 | Beardsley et al. | 364/200 |
| 4,989,134 | 1/1991 | Shaw | 395/600 |
| 5,146,589 | 9/1992 | Peet, Jr. et al. | 395/575 |
| 5,155,843 | 10/1992 | Stamm et al. | 395/575 |
| 5,193,174 | 3/1993 | Bealkowski et al. | 395/500 |
| 5,193,175 | 3/1993 | Cutts, Jr. et al. | 395/575 |
| 5,307,477 | 4/1994 | Taylor | 395/403 |
| 5,371,855 | 12/1994 | Idleman | 395/250 |
| 5,440,727 | 8/1995 | Bhide | 395/444 |
| 5,442,752 | 8/1995 | Styczinski | 395/404 |
| 5,448,719 | 9/1995 | Schultz | 395/182.03 |
| 5,463,765 | 10/1995 | Kakuta | 395/182.04 |

*Primary Examiner*—Eric Coleman
*Attorney, Agent, or Firm*—Baker, Maxham, Jester & Meador

[57] ABSTRACT

A system and method for reducing device wait time in response to a host initiated write operation modifying a data block. The system includes a host computer channel connected to a storage controller which has cache memory and a nonvolatile storage buffer in a first embodiment. An identical system makes up the second embodiment with the exception that there is no nonvolatile storage buffer in the storage controller of the second embodiment. The controller in either embodiment is coupled to a cache storage drawer containing a plurality of DASD devices for implementing a RAID parity data protection scheme, and for permanently storing data. The drawer has nonvolatile cache memory which is used for accepting data destaged from controller cache. In a first embodiment, no commit reply is sent to the controller to indicate that data has been written to DASD. Instead a status information block is created to indicate that the data has been destaged from controller cache but is not committed. The status information is stored in directory means attached to the controller. The system uses this information to create a list of data which is in the state of Not committed. In this way data can be committed according to a cache management algorithm of least recently used (LRU), rather than requiring synchronous commit which is inefficient because it requires waiting on a commit response and ties up nonvolatile storage space allocated to back-up copies of cache data. In a second embodiment, directory means attached to the controller stores information about status blocks that may be modified or unmodified. The status information is used to eliminate wait times associated with waiting for data to be written to HDAs below.

15 Claims, 21 Drawing Sheets

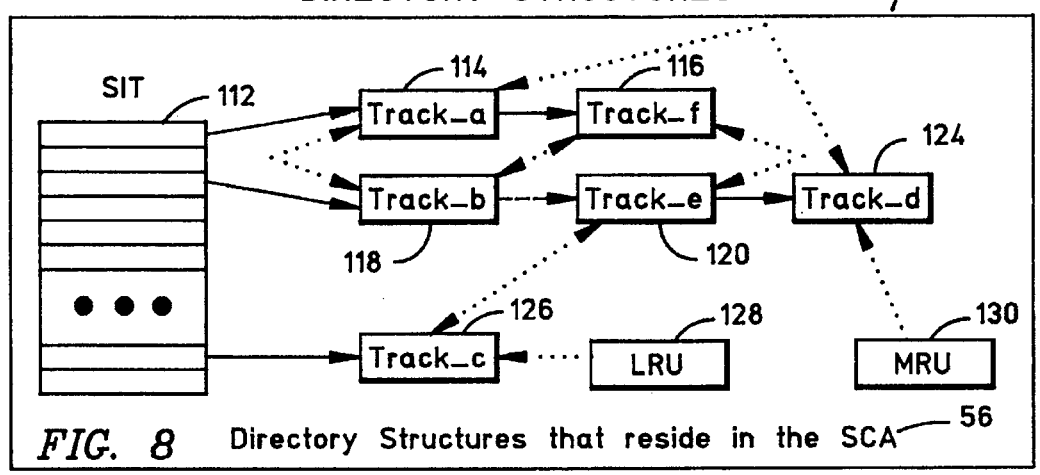
FIG. 8  Directory Structures that reside in the SCA
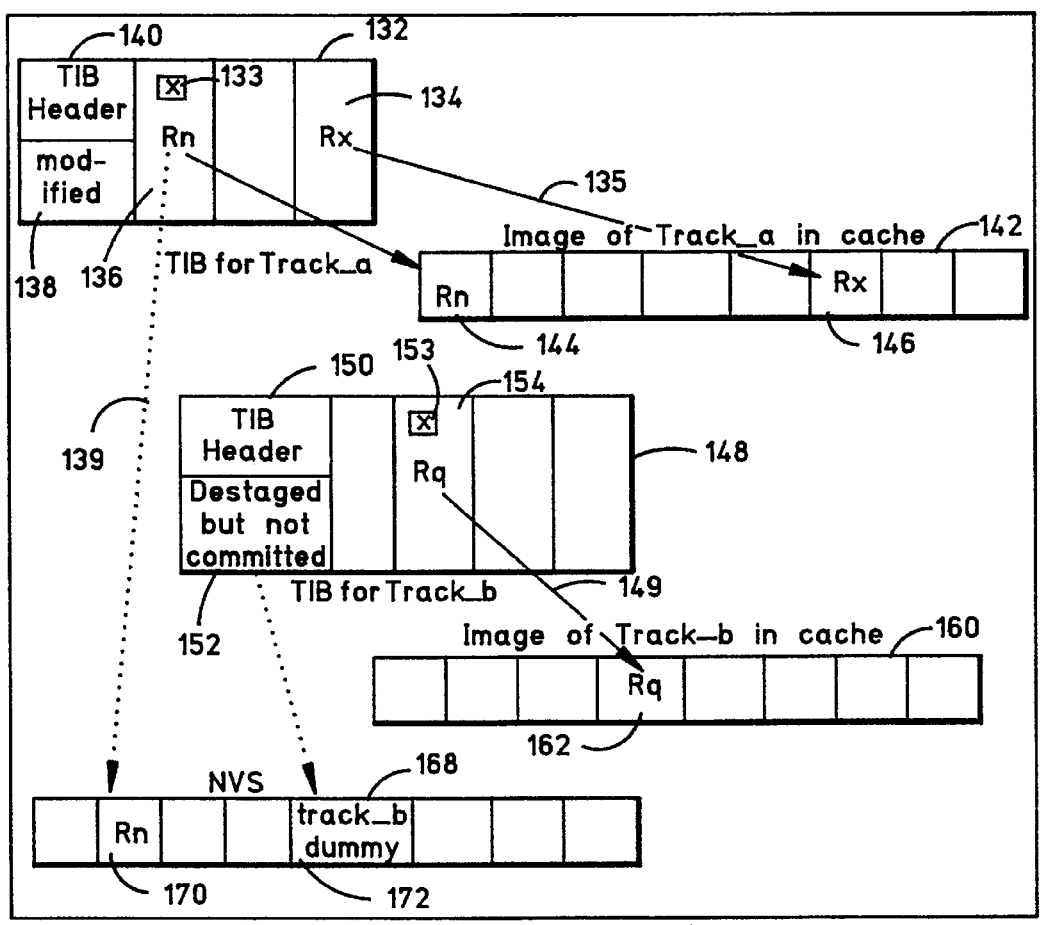
FIG. 9

Cache States of Track Before Invention

PERFORMANCE ENHANCEMENT SYSTEM AND METHOD FOR A HIERARCHICAL DATA CACHE USING A RAID PARITY SCHEME

BACKGROUND OF THE INVENTION

1. Field of the Invention

This invention relates generally to enhancement of performance for hierarchical caching of data and particularly to a system and method employing techniques which reduce host computer channel and control unit wait time while employing a RAID parity data recovery scheme.

2. Description of the Related Art

Modern high-performance data processors use a private high-speed hardware-managed buffer memory in front of the main data store to reduce average memory access delay at the Central Processing Unit (CPU). This high-speed buffer is denominated a "cache" because it is usually transparent to the applications programmer. Because hardware speed is generally directly proportional to hardware cost, the cached memory features can be cost-effectively improved by adding another faster cache in front of the first cache if made smaller. Such multilevel cache "hierarchies" are known in the art to give rise to a requirement for "coherence management" in shared memory multiprocessing configurations because each CPU is directly coupled only to its private cache. That is, the temporary contents of many separate private cache buffers must be somehow coordinated to ensure that only the most recent record copies are "committed" to the underlying main data store. The term "committed" typically means data is written and a commit message indicating the write operation is sent to a controller.

Another problem related to overall system performance arises in systems that employ multilevel data storage subsystems. For instance, a modern shared-storage multiprocessing system may include a plurality of host processors coupled through several cache buffer levels to a hierarchical data store that includes a random access memory level followed by one or more larger, slower storage levels such as Direct Access Storage Device (DASD) and tape library subsystems. Transfer of data up and down such a multilevel shared-storage hierarchy requires data transfer controllers at each level to optimize overall transfer efficiency.

Until electronically stored data is committed to a permanent form of storage, the data is volatile, i.e., subject to being lost if power is interrupted. For this reason, elaborate schemes have been employed in the art to protect data without the inherent time lag required for permanent DASD storage that usually employ head disk assemblies (HDAs) requiring mechanical movements to read and write data. Such a scheme involves some type of nonvolatile buffer that stores back-up copies of modified data stored in electronic high speed cache memory until the data is committed to an HDA. Additionally, the modified data is retained in cache memory until the data is committed. Typically the cache and nonvolatile buffer are part of or attached to a control unit that manages both of them. In keeping with data integrity requirements, this ensures that at least two coherent copies of the data are available, with at least one being stored on a nonvolatile medium.

The IBM 3990 storage controller is an example of a storage controller used to control data transfer between DASD-based storage libraries and host computer processors. This storage controller includes a local cache memory for buffering data transfers to and from the underlying DASD storage subsystem. Additionally, this controller is equipped with NVS for storing back-up copies of modified data in cache. The IBM 3990 storage control subsystem is fully described in "IBM 3990 Storage Control Planning, Installation and Storage Administration Guide" (IBM document GA32-0100-04, International Business Machines Corporation, copyright 1991) and in "IBM 3990 Storage Control Introduction" (IBM document GA32-0098-0, International Business Machines Corporation, copyright 1987). Each of these documents may be ordered directly from IBM.

One model of a typical NVS equipped storage controller, IBM 3990 Model 3, handles up to 16 channels from host computers and up to 64 logical DASDs. Another model, the IBM 3990-6, in a configuration supporting an architecture known as the Enterprise System Connection (ESCON) environment, can support up to 128 logical channels over eight physical channels. Within the storage controller are two multipath storage directors and four storage paths, two of which are associated with each multipath storage director. Each multipath storage director may be connected to up to eight incoming channels from host computers, for a total of 16 channels. Thus, each multipath storage director functions as an eight-by-two switch.

Another example storage controller is the 9340 and its descendants such as the IBM 9343. Similarly to the IBM 3990 storage controller, the IBM 9343 is used to control data transfer between DASD-based storage libraries and host computer processors. The IBM 9343 storage controller includes a local cache memory, but is not equipped with nonvolatile storage (NVS). The IBM 9340 storage control subsystem is fully described in "IBM 9340 Direct Access Storage Subsystems Reference" (IBM document GC26-4647-01). This document may be ordered directly from IBM.

A typical non-NVS equipped storage controller (IBM 9343 and 9345) holds up to eight channels from host computers and up to 64 logical DASDs. There are two storage clusters, each having four system adapters, allowing communication with four host channels per cluster. A device adapter attaches to a DASD port. There are two device adapters per cluster, or four per device. Thus, up to four writes may be processed simultaneously, and by accessing data stored in cache up to eight reads may be processed simultaneously through the system adapters.

As is known in the art, channels are physical links between a host computer processor and an external device, such as a DASD data storage subsystem. Usually, a host computer has a small number of channels, each physically connected to channel control multiplexers such as the IBM 3990 or 9343 storage controller. For instance, several host computer processors may be connected to one IBM 3990-3 or 3990-6 storage controller, which in turn is connected to sixty-four DASD volumes. When transferring data, the storage controller can secure any one of the plurality of channels and storage paths back to the host computer and forward to the DASD to establish a temporary input/output transaction data path. It is a feature of the IBM 3990 storage controller that such a data path between a host computer and a DASD subsystem may be severed into two separate connection intervals, each of which may be handled over a different physical channel and storage path. That is, a DASD access request need not be answered over the same channel on which it is received. This feature increases storage controller efficiency because the storage controller is free to handle other tasks during the disconnect interval between request and response.

Recent advances in DASD storage library art include exploitation of the Redundant Arrays of Inexpensive Disks (RAID) technology now well-known in the art. RAID theory is described by Patterson et al. "A Case for Redundant Arrays of Inexpensive Disks", Proc. ACM SIGMOD Conf., Chicago, Ill., Jun. 1988). RAID DASD technology has led to development of a DASD storage system rack incorporating a plurality of cached DASD modules each organized to emulate logical DASD storage volumes. Each module includes a high-speed cache buffer memory for facilitating data transfers between a specific plurality of DASDs and a channel to the adjacent storage controller. Such a module is herein denominated a Cached Storage Drawer (CSD) subsystem.

The independent development of a new CSD RAID type of DASD subsystem and a distributed host processor storage controller has given rise to a new variation of the cache hierarchy architecture known in the art. The IBM 3990 and the IBM 9340 types of storage controller both provide a cache buffer memory to support data transfer between host computer and DASD-based storage subsystem. The CSD subsystem provides internal cache buffer memory to support data transfers in and out of the RAID plurality of DASDs. Thus, connecting the IBM 3990 or the IBM 9340 type of storage controller to a CSD storage system creates an unplanned dual-cache hierarchy comprising either storage controller cache and the CSD cache. Each of these two attached cache memories is independently managed for different purposes, including the aging and demotion of cache entries according to a Least Recently Used (LRU) priority scheme and the like. This unplanned duplication presents novel problems and opportunities heretofore unknown in the hierarchical cache art.

A significant problem involved with including the CSD subsystem for implementation of RAID technology is the associated phenomenon known as the "RAID write penalty". Typically in a RAID architecture, parity data is created by some parity calculation, such as an exclusive OR operation and the parity is used to reconstruct user data in the event of some type of failure. In recent versions of the RAID architecture, for example RAID 5, this parity is spread across an array of drives to avoid bottlenecks, i.e., data traffic related to writing parity being concentrated at one drive. Unfortunately, this means that a write operation must occur at each drive on which parity is kept resulting in a significant lag time. Generally, the RAID write penalty refers to the extra overhead of reading the data from a drive, reading parity, generating parity, and the writing of the data and the parity.

In a RAID 5 architecture, a host channel implemented write follows the following general pattern. The storage controller selects a logical device in the CSD subsystem on which the host requested track image resides, and then orients to the correct host requested record. The logical device refers to emulated track images which appear to the control unit as a physical track on a COUNT, KEY, DATA, (CKD) formatted disk drive. The track images are actually stored in FBA format on HDAs using a small computer system interface (SCSI). The CKD to FBA format mapping is transparent to the storage controller which interacts as if the data is contained on a physical drive in CKD format. The CKD and FBA format and the related mapping techniques are incidental to the present invention and are well known in the art. The record is modified in the CSD cache, and a commit request is issued from the storage controller to the CSD subsystem. The control unit disconnects from the CSD subsystem, but the logical device in the CSD subsystem remains busy and is not available to service controller requests (e.g., as cache read misses, discussed in detail below). Additionally the storage controller cannot destage additional track images to the CSD cache until a commit reply is returned from the CSD subsystem. The NVS storage space dedicated to storing back-up copies of the modified records cannot be freed until a commit signal is returned from the CSD subsystem. Otherwise, without the NVS requirement, data integrity might be compromised because there would be no nonvolatile form of the data until it was written to HDA. In a system employing a storage controller without NVS storage, the RAID write penalty has the same effect, but the only way to ensure data integrity is to issue a commit to force the data to be written to HDA. Finally, upon finishing the RAID parity algorithm, the CSD subsystem issues a commit complete to the storage controller. It should be apparent to one skilled in the art that waiting for a synchronous commit on data to be written directly to HDA in a system using a RAID architecture is inherently disadvantageous because of the mechanical lag time associated with each HDA. On the other hand, the commit and writing the data to HDA serve a useful purpose in ensuring data integrity and coherency, such that the tension between performance versus integrity and coherency is significant in a system employing a RAID scheme.

In U.S. Pat. No. 4,875,155, Iskiyan et al. disclose a method for managing data in a peripheral subsystem in such a way that performance is balanced against the interest of ensuring data integrity. The '155 patent is herein incorporated by reference in its entirety for its disclosure related to general cache management in a mainframe environment. This patent is assigned to the assignee of the present invention. The '155 patent discloses an asynchronous destage of data in cache in which the order or priority of events is determined by optimizing how often a least recently used destage function is called. Essentially, as cache entries reach the bottom of LRU lists, the data needs to be destaged to DASD to make room for replacement data. A LRU scan function searches the LRU list to add modified entries to a LRU destage queue. According to the number of modified entries found, priority is determined for dispatching asynchronous destages. This method optimizes cache management, but does not address the problem of controller tie-up waiting for a commit or freeing nonvolatile storage before a commit is received. Nor does the '155 patent disclose a technique for avoiding extended control unit delays due to the RAID write penalty in a system employing either a controller having or not having NVS.

An article in International Business Machines Technical Disclosure Bulletin, by Beardsley et at., April 1990 at pages 70–75, describes cache management which employs a scheme to control cache by enabling commands under user control. The scheme involves a host operating system used to override the user to ensure that cache resources are not overallocated. The status of the cache is available to the storage controller on an asynchronous basis. Special interception commands make cache and NVS devices available and unavailable for use. However, the management of the actual storage space is not disclosed. Nor does this disclosure deal with the above-mentioned problems of controller tie-up and NVS space being unavailable while a commit reply is sought at the controller. The article also does not deal with the problem of minimizing a RAID write penalty in a cache hierarchy.

In U.S. Pat. No. 4,916,605 to Beardsley et at., and assigned to the assignee of the present invention, a technique is described for performing a fast write operation. The '605 patent is herein incorporated by reference in its entirety. The fast write technique is incorporated in the IBM 3990 in the form of a DASD fast write and a cache fast write. Both fast write capabilities permit write operations from a host computer channel to be implemented at cache speed. A DASD fast write maintains a copy of the data in NVS until it is destaged (i.e. written from cache to the DASD). Cache fast write is typically used with special kinds of data, such as temporary data created by a work file. Cache fast write does not use NVS. The present invention, while useful with either or any type of host initiated write operation, is especially useful with DASD fast writes. In the 3990-3, a DASD fast write requires that a commit request be sent from the control unit to the CSD after data has been written to cache memory in the CSD. Once the data is successfully destaged from the cache in the CSD to the RAID plurality of DASD HDAs, a commit reply is sent to the control unit indicating the data is written to HDA. For a host channel write operation, the control unit waits for the commit reply before presenting end status, thus completing the operation and freeing the control unit for handling other host initiated tasks. Additionally, the NVS space dedicated to back-up copies of the modified data is also unavailable until the commit reply is received.

It is clear from these references that the prior art is unconcerned with the new phenomenon of the RAID write penalty presented in a cache hierarchy employing a CSD having CSD cache and RAID DASD. Nor is the prior art concerned with the problems presented by employing a synchronous commit when data is destaged from controller cache to CSD cache. Finally, the prior art does not teach or suggest techniques to recover nonvolatile storage space without impacting data integrity, and while also overcoming the performance disadvantages of using a synchronous commit while employing a RAID scheme. When a CSD data storage library subsystem is coupled with a plurality of distributed host processors through one or more cache storage controllers, there is a clearly-felt need in the art for enhanced performance without degrading data integrity. The related unresolved deficiencies are solved by the present invention in the manner described below.

SUMMARY OF THE INVENTION

An objective of this invention is to reduce the overhead associated with the phenomenon known in the art as the RAID write penalty in a system employing a RAID parity data recovery scheme with a cache hierarchy.

A further objective of this invention is to reduce the overhead associated with the use of a synchronous commit request and reply used during destaging of data in a cache hierarchy.

Yet another objective of the present invention is to allow for the reclamation of nonvolatile storage (NVS) space which is dedicated to holding back-up copies of modified data records stored in modified data blocks in controller cache without having to wait for a commit reply to be received at the control unit.

Still another objective of this invention is to increase the probability that when the control unit issues a commit request associated with demoting a modified data block due its position in a least recently used (LRU) priority list, that the modified data blocks will have already been destaged from the cache storage drawer (CSD) cache to the underlying DASD or head disk assembly (HDA), thus increasing the response time of the commit reply.

The above objectives are accomplished by a system and method that employs a directory means connected to a controller cache memory (CCM). The controller cache memory is attached to a storage controller (SC) which is coupled to a host computer channel. In a first embodiment, the SC further has NVS storage for storing modified copies of data blocks. In a second embodiment, the SC is not equipped with NVS storage. The CCM is coupled to one or more cached storage drawers (CSDs) each of which has a plurality of head disk assemblies (HDAs) which are coupled to at least one drawer cache memory (DCM). Data blocks modified by a host computer channel initiated write operation are successively destaged through the cache hierarchy to the underlying HDAs. The DCM has an independent power source and is thus nonvolatile. In the first embodiment, the directory means stores status information related to the modified data blocks indicating whether they have been destaged or committed. Thus, the inventors have added a new state transition for modified data blocks which is relevantly denominated as "destaged and not committed". The new state is employed by the system to improve performance and ensure data integrity. Because the DCM has an independent power source, the new status can be used to alert the SC that data is safely destaged to DCM and thus the SC is free to remove NVS storage space dedicated to back-up copies of modified data blocks. In the second embodiment, the directory means stores status information related to modified and unmodified data blocks indicating the location of the data block in cache and the location of the block on an underlying HDA. This directory information is used to safely store information in cache without requiring the CSD to be tied up while data is stored on an HDA.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 8 is a diagram illustrating a directory means coupled to the CCM and data structures contained within that directory means that are employed by the present invention and used with the SC of FIG. 2A;

FIG. 9 is a more detailed illustration of the data structures shown in FIG. 8 showing status information stored in the directory means;

DETAILED DESCRIPTION OF THE PREFERRED EMBODIMENTS

System Architecture

Figure 1:
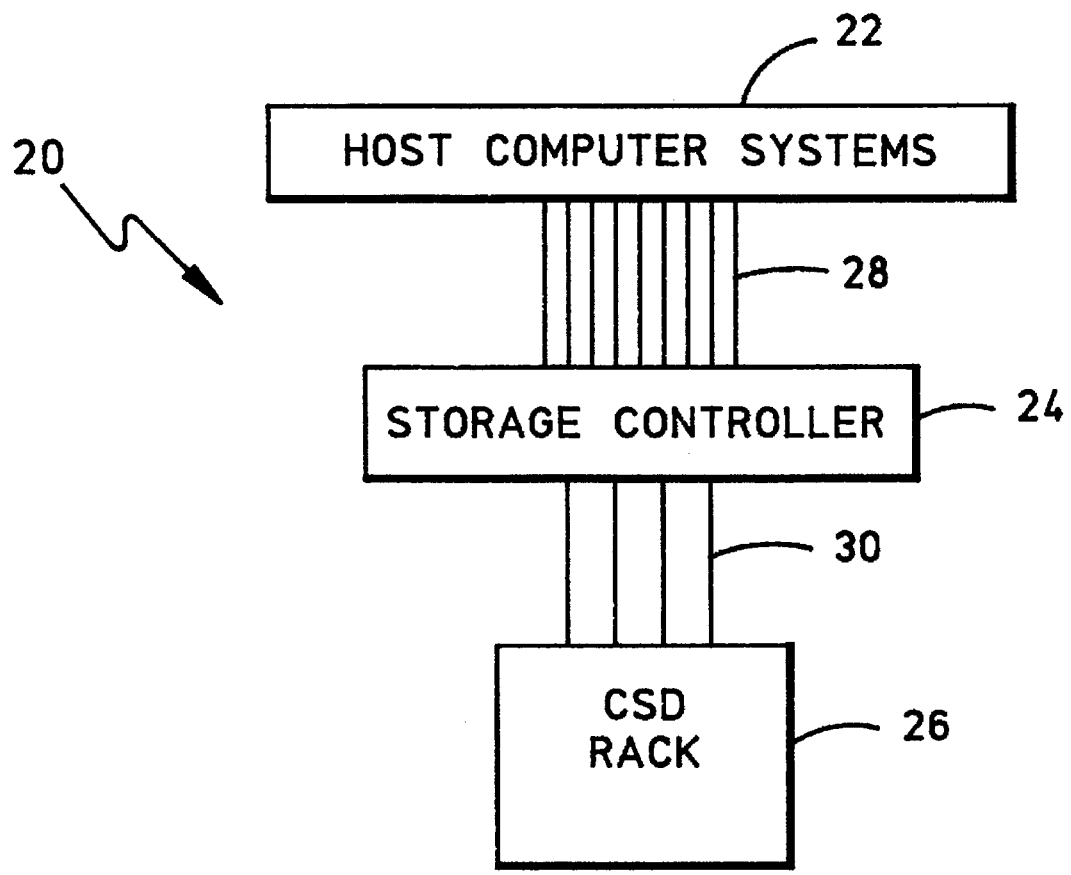
FIG. 1 is a functional block diagram of a distributed data processing system suitable for implementation of the system of this invention.

FIG. 1 shows a simplified functional block diagram of a large distributed host data processing system 20. The specific elements of system 20 pertaining to this disclosure are the plurality of host computer systems 22, the storage controller (SC) 24, and a storage library rack 26, which consists of a plurality of Cached Storage Drawers (CSDs) one of which is further described below in connection with FIGS. 4–5. Storage controller 24 is herein preferably an IBM 3990 Model 6 type controller in a first embodiment, which is described in detail in the above cited IBM documents. In a second embodiment, storage controller 24 is herein preferably a descendant of an IBM 9340 type controller, which is described in detail in the above cited IBM documents. The host computers in plurality 22 are each typically mainframe systems such as the IBM 3090, the ES9000 Model computer or comparable systems known in the art. Host computer plurality 22 is coupled to storage controller 24 by a plurality of data channels exemplified by host channel 28. Channel 28 may be configured to transfer data serially or in parallel. Storage controller 24 is coupled to rack 26 by means of four data paths exemplified by data path 30.

Controller with Nonvolatile Storage

Figure 2A:
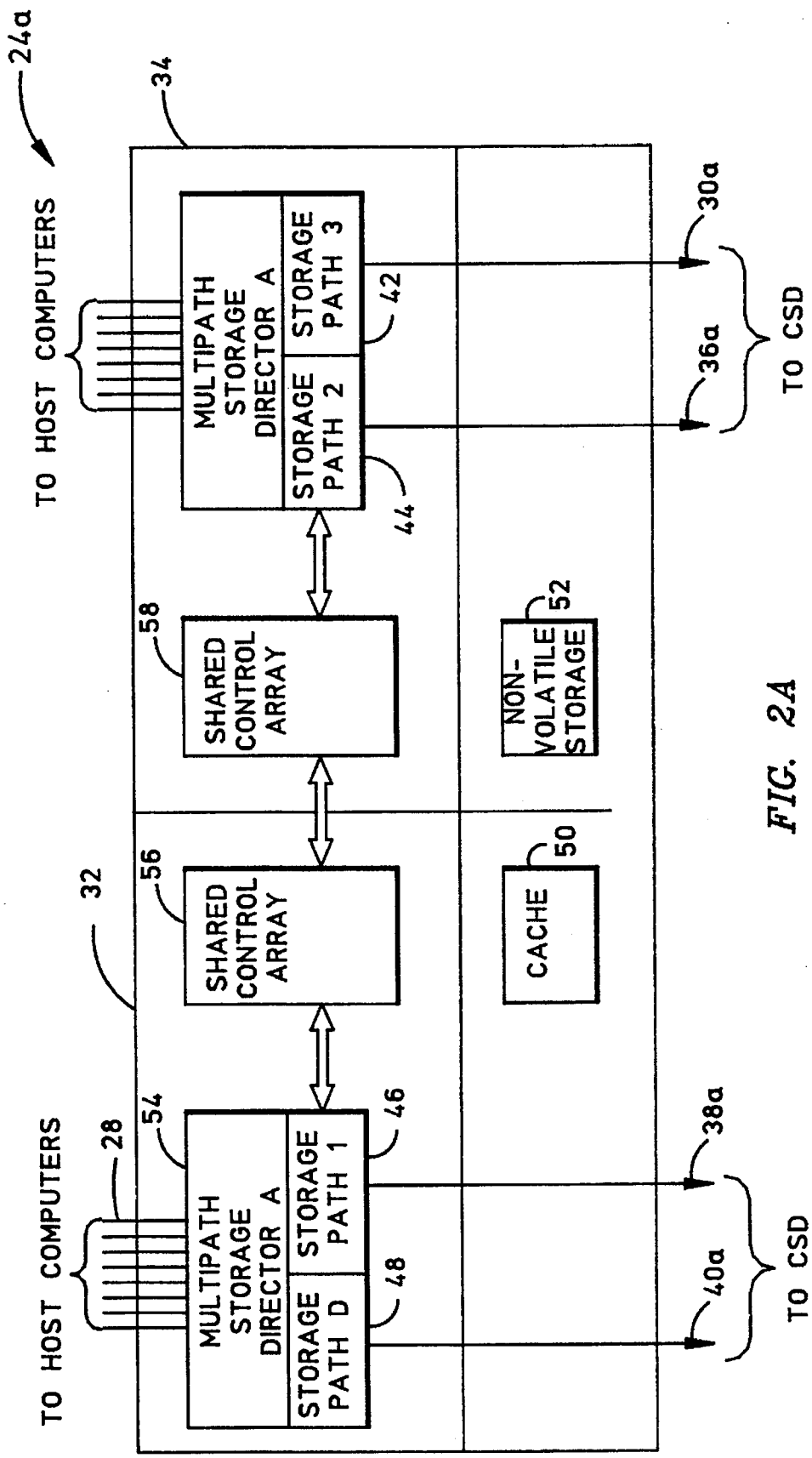
FIG. 2A is a functional block diagram of a Storage Controller (SC) of a first embodiment of the present invention from the system of FIG. 1.

FIG. 2A shows a first embodiment of the storage controller 24 herein denominated storage controller 24a, in descriptive detail. Storage controller 24 includes two storage clusters 32 and 34, each of which provides for selective connection between a host computer and a logical DASD. Both storage clusters 32 and 34 are coupled to some or all of the host computer plurality 22 through host channels exemplified by host channel 28. Thus, every host computer system has access to any of the logical DASDs for storage and retrieval of dam. When a single host computer is connected by at least two host channels, one each is connected to storage clusters 32 and 34. Similarly, where four channels are provided, two are connected to storage cluster 32 and two are connected to storage cluster 34. Storage controller 24a may receive a request from a host computer over one host channel and respond to the request over the same or any other one of the host channels connected to the same host computer. That is, storage controller 24a need not respond on the same physical channel through which a request is received. The host channels associated with one host computer are herein denominated a "path group", knowledge of which is transferred from host computer system 22 to storage controller 24a.

Referring to FIGS. 1 and 2A, the data path 30 in a first embodiment may be represented by four data paths 30a, 36a, 38a and 40a that couple storage controller 24a to CSD rack 26. Each data path 30a, 36a–40a is associated with a single dedicated storage path processor 42–48, respectively. Each data path 30a, 36a–40a is coupled to all logical storage elements of CSD rack 26 but only one such data path has access to a particular logical volume at any instant. Because storage controller 24a operates to synchronize disconnects and reconnects between storage devices and host computers based on the rotational position of a DASD disk, storage controller 24a may be viewed essentially as a data transfer traffic manager. Such traffic management scheme must respond as quickly as possible to addressed data requests received over the host channels, so storage controller 24a is organized to keep storage path processors 42–48 fully occupied with data moving between host computer system 22 and CSD rack 26.

In addition to storage clusters 32 and 34, storage controller 24a includes a controller cache memory (CCM) 50 and a nonvolatile store 52. CCM 50 provides storage for frequently accessed data and buffering to provide balanced response times for cache writes and cache reads. Nonvolatile store 52 provides temporary storage of data being written to CCM 50 until destaged to permanent storage in CSD rack 26. Commitment to storage in nonvolatile store 52 enables storage controller 24a to assure host computer system 22 that an addressed data write request is logically complete even though actual destaging to permanent storage media is still pending.

Storage clusters 32 and 34 provide identical functional features, which are now described in connection with storage cluster 32 alone. Storage cluster 32 includes a multipath storage director 54 that operates as a four or eight by two switch between the host channels and signal path processors 46–48. Storage cluster 32 also includes a shared control array 56 that duplicates the contents of the shared control array 58 in storage cluster 34. Shared control arrays 56–58 store path group information and control blocks for the logical DASDs in CSD rack 26 and may also include some of the data structures used to control CCM 50 and to practice the method of this invention as described below. Such data structures may also be stored in CCM 50.

Figure 3A:
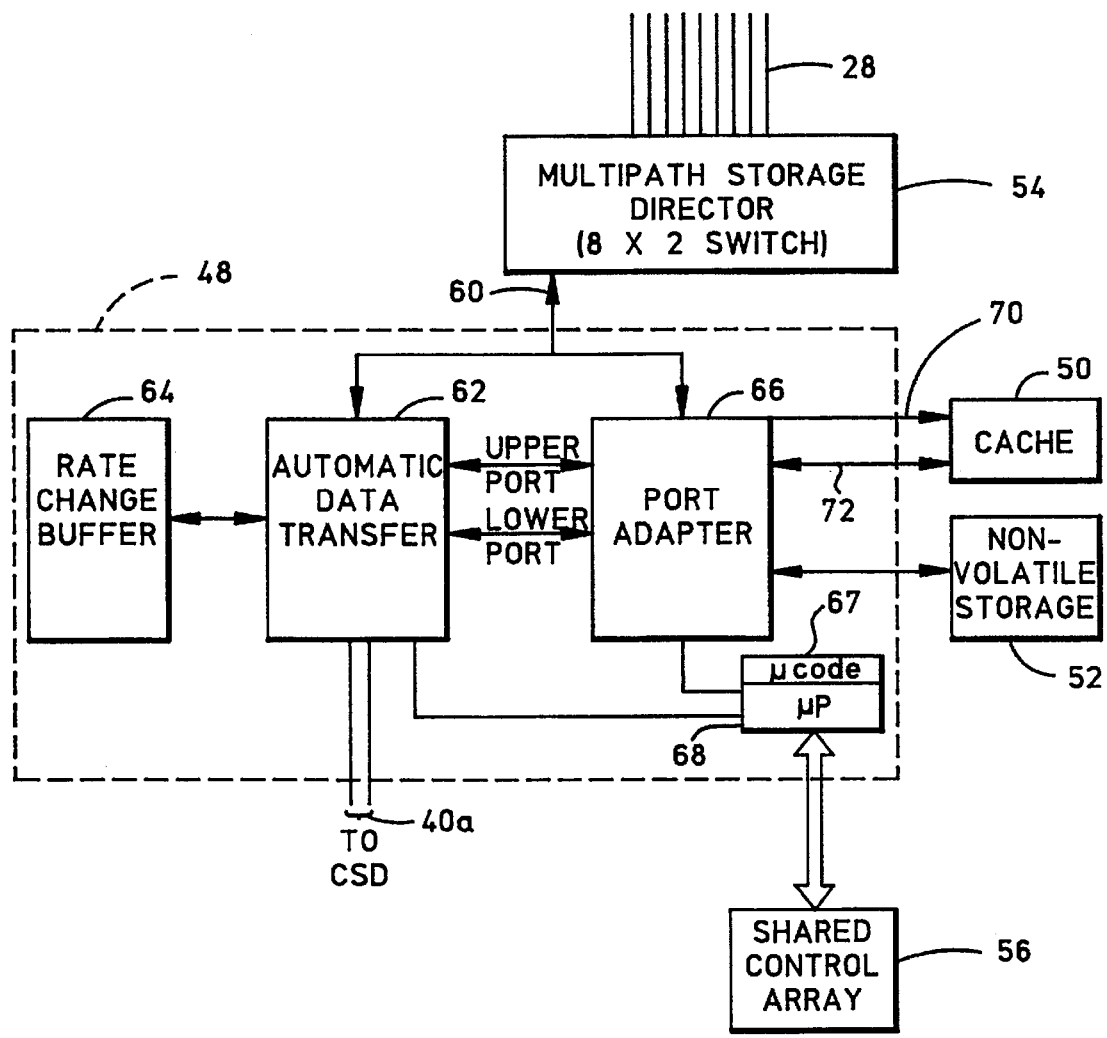
FIG. 3A is a functional block diagram of a storage path processor from the SC of FIG. 2A.

FIG. 3A shows storage path processor 48 in more detail. Processor 48 is coupled to multipath storage director 54 by the upper port 60 and to CSD rack 26 by the lower data path 40a. Data transfer between multipath storage director 54 and a logical DASD store in CSD rack 26 is synchronized in an automatic data transfer circuit 62, which is supported by a rate-change buffer 64 as necessary. Rate-change buffer 64 compensates for data transfer speed differences between CSD rack 26 and host channel 28, which is usually faster. A port adapter 66 controls data transfers between CCM 50, nonvolatile store 52 and data path 40a. Port adapter 66 also controls data transfers between CCM 50, nonvolatile store 52, and upper port 60. CCM 50 and nonvolatile store 52 operate in part to provide logical completion of addressed data write requests without awaiting physical synchronization of associated rotating storage disks. All operations of storage path processor 48 are controlled by a microprocessor 68. CCM 50 has two ports 70 and 72. Port 70 is coupled through port adapter 66 to upper port 60 and port 72 is coupled through port adapter 66 and automatic data transfer circuit 62 to data path 40a. Port adapter 66 is coupled through two ports to automatic data transfer circuit 62, thereby permitting simultaneous data flow from either upper port 60 or data path 40a through the associated elements of storage path processor 48 to CCM 50.

Controller without Nonvolatile Storage

Figure 2B:
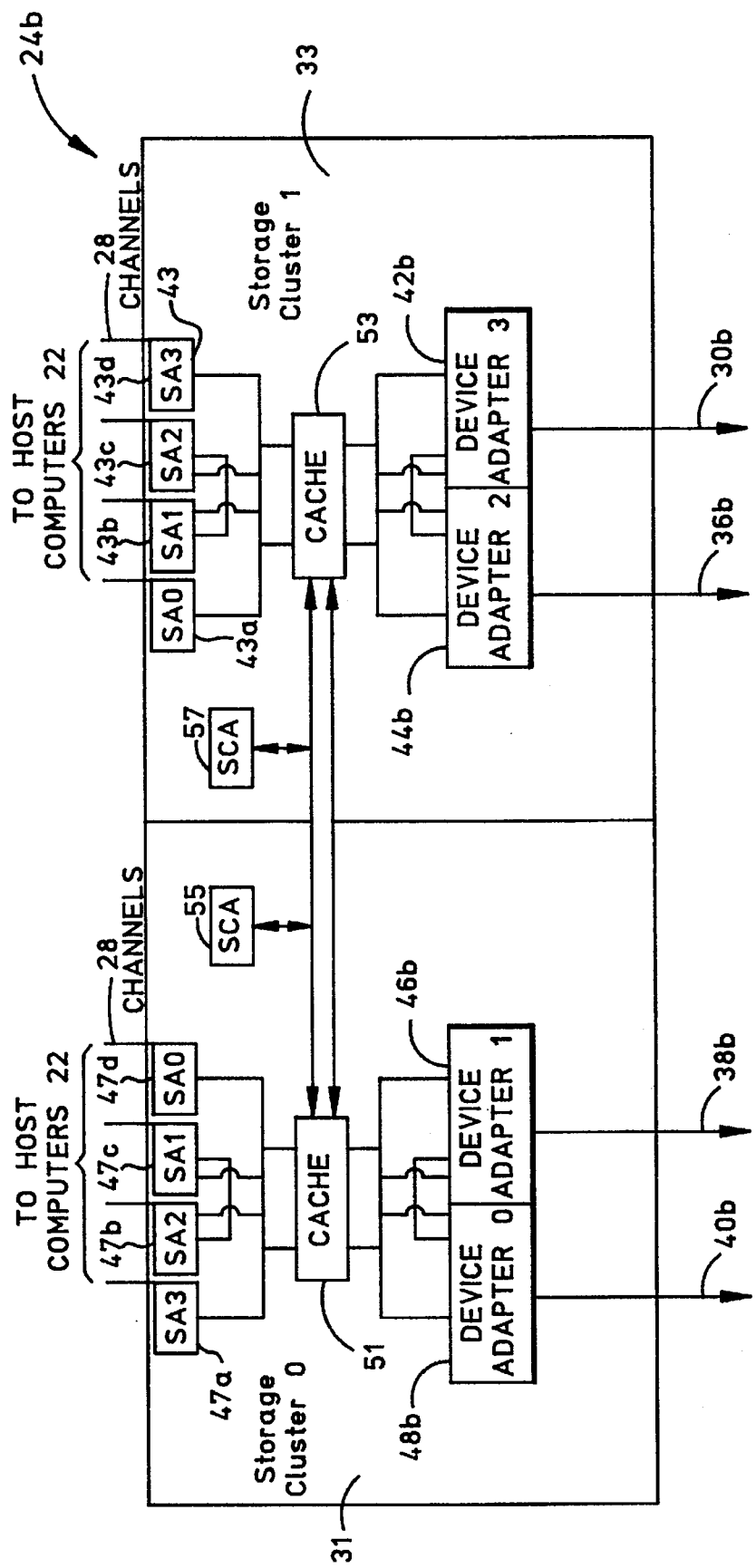
FIG. 2B is a functional block diagram of a SC of a second embodiment of the present invention, the SC belonging to the system of FIG. 1.

FIG. 2B provides a simple organizational schematic of a second embodiment of storage controller 24 herein denominated as storage controller 24b. Storage controller 24b includes two storage clusters 31 and 33, each of which provides for selective connection between a host computer and a logical DASD. Both storage clusters 31 and 33 are coupled to some or all the host computer plurality through host channels exemplified by host channel 28. Four system adapters in each storage cluster are attached to a host computer channel 28.

In cluster 31 system adapter 47a, 47b, 47c, and 47d serve to connect a host computer channel and a logical DASD respectively. An identical function in storage cluster 33 is provided by system adapter 43a, 43b, 43c and 43d. A physical device such as a DASD is written to directly through host computer channel 28 through a device adapter 48b, 46b, 44b, or 42b.

The data path 30 in a second embodiment may be represented by the four data paths 40b, 38b, 36b, and 30b. The four data paths 40b, 38b, 36b and 30b couple storage controller 24b to CSDs in the CSD rack 26. Each data path 30b, 36b, 38b and 40b is associated with a single dedicated device adapter 42b, 44b, 38b and 48b, respectively. Because storage controller 24b operates to synchronize disconnects and reconnects between storage devices and host computers based on the rotational position of a DASD disk, storage controller 24b may be used essentially as a data transfer traffic manager. Within storage clusters 31 and 33, storage controller 24b includes a CCM 51 and CCM 53. CCM 51 and CCM 53 perform identical tasks but handle different data according to host channel connections and, therefore use their duplication and function to increase the rate of data traffic handled by storage controller 24b. Further, storage clusters 31 and 33 provide identical functional features, which are now described in connection with storage cluster 31 alone. Storage cluster 31 includes a shared control array 56 that duplicates the contents of the shared control array 57 in storage cluster 33. Shared control arrays 55 and 57 store control information that represents the execution of a host computer channel 28 implemented process. It is envisioned by the inventors that directory means used to store data structures used to control cache 51 may be stored directly in cache 51; however, the shared control array may also be used for this purpose without departing from the spirit of the invention.

Figure 3B:
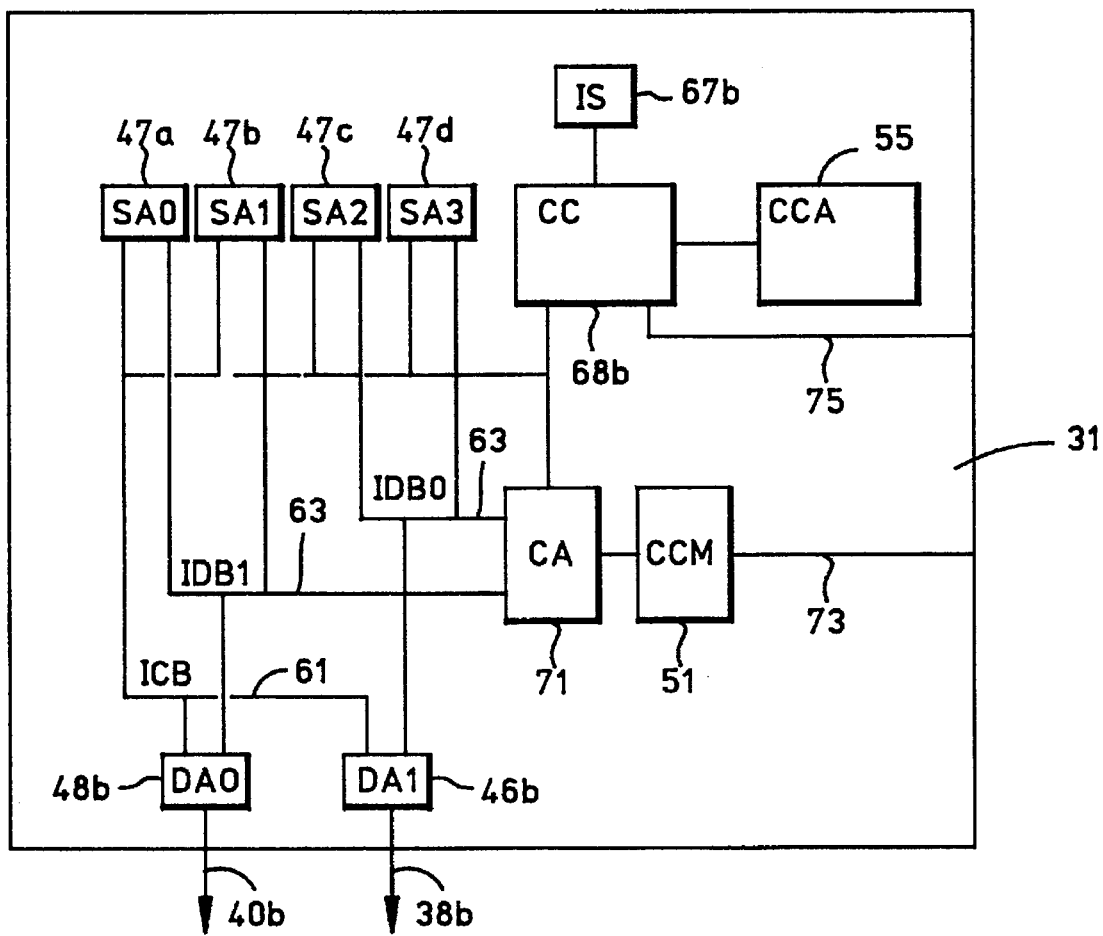
FIG. 3B is a more detailed depiction of the functional block diagram of FIG. 2B.

FIG. 3B shows cluster 31 of storage controller 24b in more detail. System adapter 47a is coupled to device adapter 48b and 46b through an internal control bus 61 which connects various adapters to a control cluster 68b. In a similar fashion, system adapters 47b–d are also coupled to the same elements. The control cluster 68b is a microprocessor which executes microcode stored in instruction store 67b. In a preferred embodiment of the present invention the methods useful with controller 24b which contains no nonvolatile store is executed by microcode stored in instruction store 67b. The cluster controller 68b and each system adapter 47a, 47b, 47c and 48d are each linked by internal data bus 63 to cache adapter 71. The cache adapter 71 acts as a port to CCM 51 between the cluster controller 68b and system adapters 47a, 47b, 47c and 47d. Additionally, the cache adapter 71 acts as a port to device adapter 48b and device adapter 46b. The internal data bus 65 which carries data between a respective system adapter and the cache adapter 71 to the CCM 51 serves an identical function to that of internal data bus 63, but connects different adapters to the cache adapter 71. The cluster controller 68b is attached directly to CCM 51 through the cache adapter 71 and directly to shared control array 55. Further, the cluster controller 68b may access either device adapter 48b or 46b directly through the internal control bus 61. Also the cluster controller 68b may access the system adapters 47a, 47b, 47c and 48d, through the internal control bus 61. Microprocessors (not shown) in device adapters 48b and 46b synchronize and control data transfer between storage cluster 31 and a logical DASD volume in CSD rack 26 through data paths 40b and 38b, which are identical to data paths 36b and 30b in cluster 33. An extended control bus 75 connects the cluster controller 68b to an identical cluster controller (not shown) in cluster 33. Through external control bus 75 either cluster controller may access the internal control bus of the other storage cluster. Similarly an external data bus 73 connects the CCM 51 with the CCM 57 (not shown in FIG. 3), and through the cache adapter 71 allows either CCM to access the internal data bus of either cluster.

Cache Storage Drawers

Figure 4A:
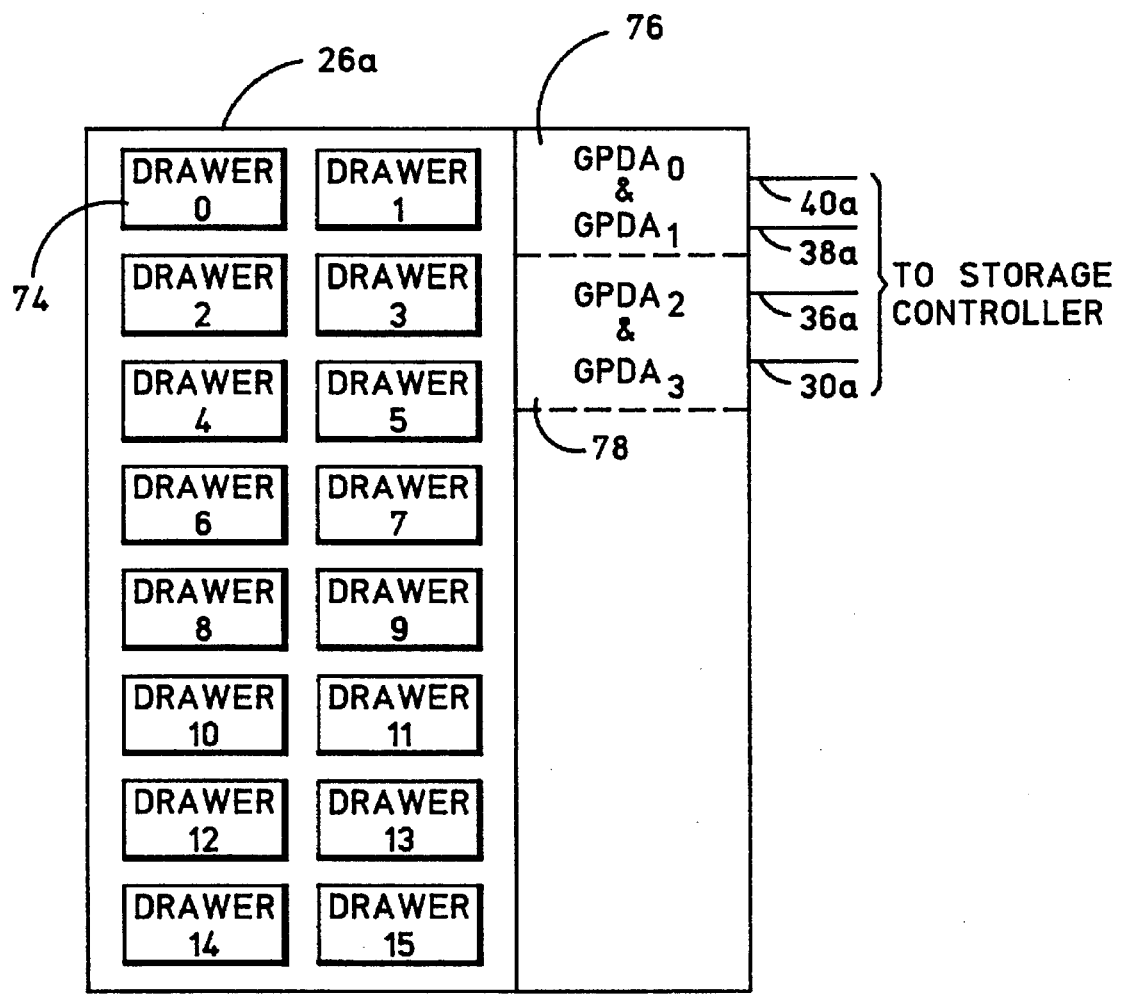
FIG. 4A is a sketch showing sixteen Cached Storage Drawers (CSDs) disposed in a single Direct Access Storage Device (DASD) storage subsystem rack and the interface to the SC of FIG. 2A.
Figure 4B:
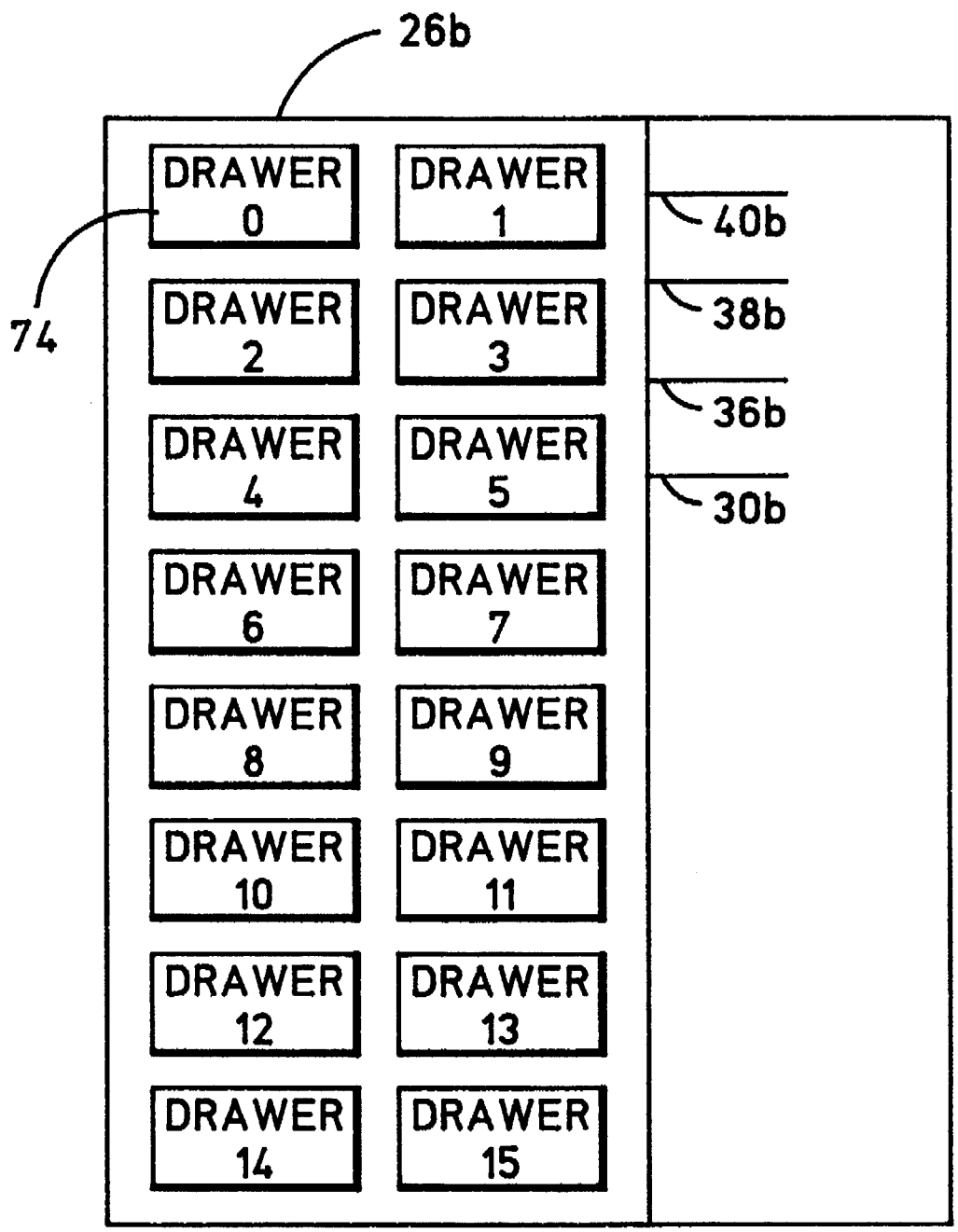
FIG. 4B is a sketch showing sixteen cached storage drawers (CSDs) and the SC of FIG. 2B disposed in a single direct access storage device (DASD) storage subsystem rack.
Figure 5:
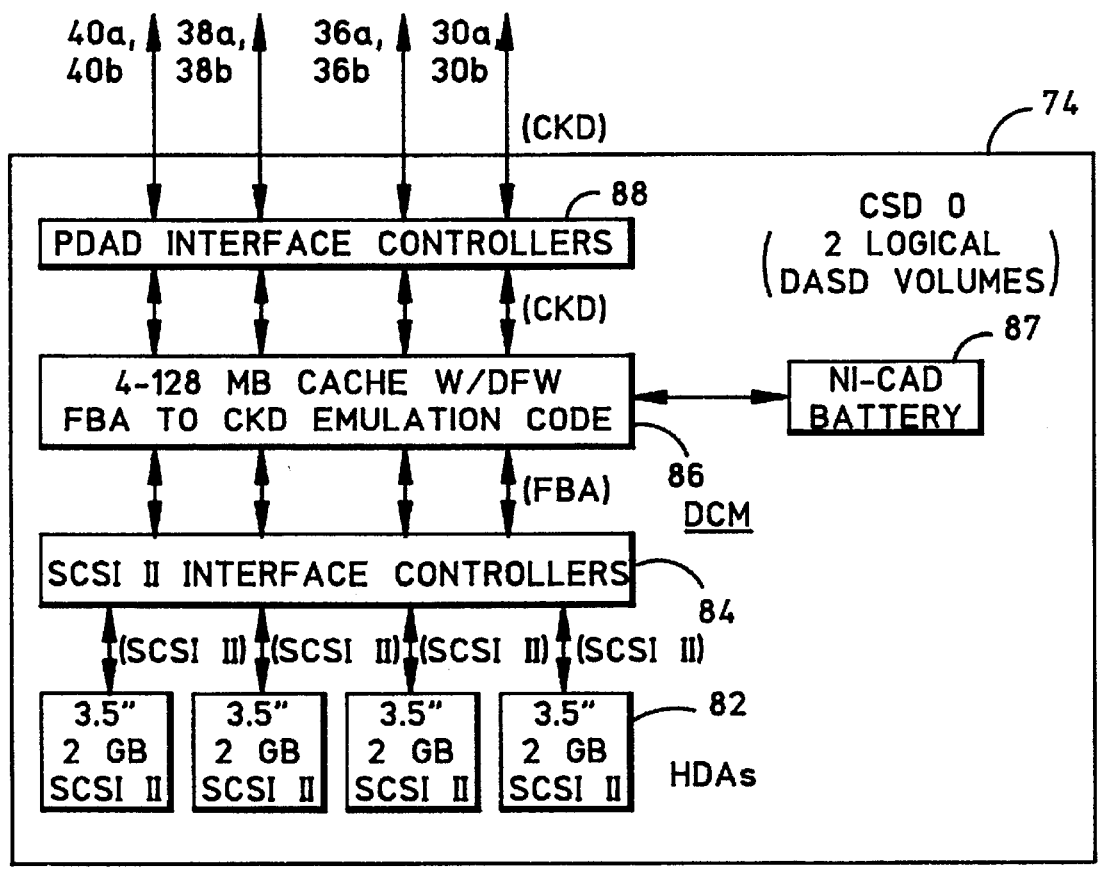
FIG. 5 is a functional block diagram of one CSD and the interfacing means to the SC of the system of FIG. 1.

Referring to FIGS. 3B, 4A and 4B, CSD rack 26 is shown as 26a in the first embodiment (FIG. 4A) and 26b in the second embodiment. FIG. 4A provides a simple organizational schematic illustration of CSD rack 26a. Rack 26a includes 16 CSDs exemplified by CSD 74. Each of the 16 CSDs are coupled to two GPDA interface circuits 76 and 78, each of which supports two of the four data paths 30a, 36a–40a. FIG. 5 provides a simple organizational schematic of CSD rack 26b. Rack 26b includes 16 CSDs exemplified by CSD 74. Each of the 16 CSDs are coupled to the four data paths 30b, 36b–40b. The device adapters 42b–48b (FIG. 3B) serve the same function as the GPDA interface circuits in the first embodiment. These elements are shown in additional detail in FIG. 5.

FIG. 5 shows a functional representation of CSD 74 coupled through an interface 88 to data paths 30a, 36a–40a in a first embodiment or 30b, 36b–40b in a second embodiment. The GPDA interface circuits 76 and 78, of the first embodiment, are not shown for the sake of simplicity. An effective data switch (not shown) connects selected ones of the 16 CSDs in CSD rack 26 to the four data paths 30a, 36a–40a in one embodiment or 36b–40b in another embodiment. CSD 74 includes four Head-Disk Assemblies (HDAs)

exemplified by HDA 82. Each HDA is coupled to a SCSI-II interface 84 in the well-known manner and therefrom to the Drawer Cache Memory (DCM) 86. From the perspective of the CSD 74, either storage controller 24a or 24b looks identical to the other. Thus, in compliance with the naming conventions of the system architecture shown in FIG. 1, storage controller 24 will refer to either the storage controller 24a having NVS, or the storage controller 24b having no NVS. Similarly CSD rack 26, unless otherwise indicated, is used to include either CSD rack 26a or 26b. Like the CCM 50 discussed above in connection with FIG. 3A, DCM 86 includes dual-ported modules permitting data flow between the HDA plurality through interface 84 and also data flow upward through the PDAD interface 88 and GPDA, assembly (not shown) to storage controller 24a. DCM 86 functions similarly to CCM 50 or CCM 51, "staging" data blocks up from the HDA plurality so that addressed data requests from storage controller 24a can be serviced without waiting on disk positioning in the mechanical HDAs. Also, although not particularly relevant to the description of this invention, DCM 86 provides data format translation and emulation between Fixed Block Architecture (FBA) and Count-Key Data (CKD) record formats. In the exemplary embodiment shown in FIG. 5, the four HDAs exemplified by HDA 82 are organized to present two logical DASD storage volumes to storage controller 24. Thus, up to two simultaneous logically independent addressed data requests may be presented to CSD 74. Also, the HDA plurality is preferably organized as a RAID (Redundant Array of Inexpensive Disks) for fault tolerance.

Each CSD in rack 26 contains a large fast DCM (from 4 to 128 MB of RAM per drawer) that is used to upstage (stage) and downstage (destage) data blocks (usually in track increments) between storage controller 24 and the RAID hardware within the particular drawer. There are multiple read and write operations associated with the RAID hardware. This can be understood by considering a simplified example of a typical read operation. Referring to FIG. 1, host computer system 22 submits a "read request" over host channel 28 to storage controller 24. Storage controller 24 searches CCM 50 (FIGS. 2-3) to find the particular data addressed by the read request. When these data are not found, storage controller 24 calculates the precise CSD housing the logical DASD store in which the requested data can be found and passes this information along with the read request to CSD rack 26. When, the HDA assembly receives the read request and logical DASD information, it connects with the appropriate CSD (for instance, CSD 74) and looks for the data in DCM 86. If the data are not found in DCM 86, it is upstaged from the physical HDAs in track increments and stored in DCM 86. After the data are found in DCM 86, they are retrieved and passed back up to storage controller 24 where they are simultaneously transmitted to host computer system 22 and stored in CCM 50. After storage in CCM 50, storage controller 24 quickly services the read request on one of the host channels back to the host computer system 22. It should be readily apparent that this process always produces two cached copies of the data tracks or blocks containing the data addressed by the read request. One of these copies remains in DCM 86 and the other remains in CCM 50.

Cache Write Operations

A similar situation occurs with addressed data write requests, which can be better understood with the reference to the following discussion of cache write operations. In the usual caching system, there are three different cache modes of interest: read-only caching, DASD fast-write operations and cache fast-write operations. The fast-write operation is described in detail in the incorporated U.S. Pat. No. 4,916, 605 to Beardsley et at., and in the IBM document GA32-0100-Y. Read-only caching is a prerequisite for both the DASD and cache fast-write operations. With read-only caching, only read requests are serviced from CCM 50. With DASD fast-write and cache fast-write operations, CCM 50 also assists in servicing write-requests received on host channel 28. The overall interaction between the two cache memories, DCM 86 and CCM 50, can be better understood with a brief review of well-known cache memory operating principles, which is now presented. Although explained for the sake of simplicity in terms of the first embodiment CCM 50, the following discussion on cache memory operating principles applies to the interaction of CCM 50 or CCM 53 and DCM 86 in regard to "hits" and "misses".

For read-only caching, if a copy of the block containing the addressed data is in the cache when the read request is received, it is herein said to constitute a "read hit" on the cache and the storage control transfers the desired data from the cache memory to the channel. If a copy of the block containing the addressed data is not in the cache, it is herein denominated a "read miss" and the storage control then sends the requested data directly to the channel from the underlying storage device and, at the same time, writes the same data together with the remainder of the data block and track into the cache memory for anticipated future use. Future requests for records that follow in sequence from the initial requested data for that block are then read from the cache as "read hits".

In basic write-caching operations, if a copy of the block or track containing the addressed data is in the cache when a write request is received, it is herein said to constitute a "write hit" and the storage control writes the data directly to CSD 74 and, at the same time, writes the same data into the cache memory. This updates the record already existing in cache so that it can be referred to again. However, in a prior art configuration before the storage controller can signal the completion of the operation, successful "destaging" of the record to HDA 82 must be confirmed. Employing the system of the present invention, the record is simultaneously written to the cache memory and to the underlying storage device (such as CSD 74), with the "device end" signal returned at completion. Writing to CSD 74 ensures data integrity because copies in CCM 50 and CSD 74 are identical, and the DCM 86 is nonvolatile.

When the record being updated is not found in the cache memory, the condition is herein denominated a "write miss" and the record is written directly to the underlying data store and is not written to the cache in the basic write caching operation. However, for the fast-write operations, the record may be also be written to the cache.

The cache management procedures for both DASD and cache fast-write functions are the same. They differ in the way that they are invoked and in the fact that the DASD fast-write also uses a nonvolatile store (such as NVS 52) to provide protection against power failures, but both operations process read and write hits and misses in the same manner.

Most write operations are "write hits" because typical applications first read a record before updating it or the write operation itself creates a new record, referred to herein as a "format write". In a format write operation, the new record is written and the remainder of the block or track is formatted for new data. Thus, there is no need to verify the data on the track before allowing the cache write. Format writes are considered cache hits. For either DASD or cache fast-write operations, if a copy of the addressed data is not in the cache when the write request is received or if the operation is not a format write, the storage control writes the data both to the cache memory and the underlying storage device and the remainder of the track is staged up into the cache from the storage device. For DASD fast-write, all write hits from the host channel to the cache memory are also stored in a nonvolatile store.

DASD fast-write improves storage subsystem performance because immediate access to the underlying storage device (e.g., CSD 74) is not required for write hits and full-track format writes. DASD fast-write hit operations store data simultaneously in cache and in NVS without modification to the application and are transparent to the user. Access to the underlying data stores is not required to complete the DASD fast-write operation for write hits. Because a copy of the addressed data is stored in NVS, the storage director returns channel-end and device-end status signals together at the end of the data transfer to cache and NVS. This allows the host system to continue processing without waiting for the data to be destaged to the underlying store. The data remain in cache and in nonvolatile storage until destaged to logical DASD to free space in the cache or NVS. Most write operations operate directly with the cache without going to the underlying DASD, resulting in the same performance as a read hit operation.

Cache fast-write is an option designed for use with special kinds of data, such as temporary data created as a work file. For certain applications, intermediate work files are kept temporarily in the cache memory and the data may not be written to the underlying data store. The channel program is completely satisfied when the data is written to cache alone and does not require storage in NVS.

The above general discussion of caching operations applies both to CCM 50 (FIG. 3a) and DCM 86 (FIG. 5) except that DCM 86 is entirely nonvolatile, due to having a backup power source, such as Ni-Cad battery 87, and thus does not employ the cache-write and fast-write procedures. The following general discussion of caching algorithms also applies to both CCM 50, CCM 51 and DCM 86.

Several caching algorithms determine how the cache is managed for a specific type of operation. Typical caching algorithms include normal, sequential, by-pass cache and inhibit cache loading. Such algorithms are used for the duration of a single input/output request.

LRU Algorithms

The cache memory uses normal caching algorithms unless directed otherwise by software. Normal caching stages to the cache data that are addressed in a read request and which remain in the cache memory until least-recently-used (LRU) algorithms permit them to be overlaid by other data. Normal caching applies to both read operations and both types of fast-write operations.

The DCM 86, the CCM 50, and the CCM 51 maintain both a LRU list and a Freelist for track addresses. Data track addresses containing no modified data (that is, any modified data that have already been committed to the underlying data store) that are at the bottom of the LRU list are shifted to the top of the Freelist so long as the number of data tracks on the Freelist does not exceed a defined constant (n). The cache memory allocates track slots or bins from the bottom of the Freelist. For simplicity, the Freelist may be considered merely as the track address that is "n" positions from the bottom of a long LRU list. Thus, although a track is on the "Freelist", it may continue to be referenced as a cache hit (and thereby promoted to the top of the LRU list) until it is reallocated to a new domain. A track with modified data that are destaged from DCM 86 is not normally purged from the DCM 86 but instead retains its place on the DCM LRU list (it was promoted to top priority when accessed by the write request). This discussion has treated cache space management from a simplistic point of view, in order to focus on the relevant points to the present invention. It will be appreciated by those skilled in the art that actual cache space management is more complicated, and typically involves paging techniques. For example, either CCM 50 or 51 may be broken into 16K pages (also referred to as segments). Thus a track image in cache will require one to five segments. These segments can be allocated from anywhere in cache space. When a track image is demoted then the segments that were allocated to the track image are returned to the Freelist.

Sequential access methods are best implemented using sequential caching algorithms. Sequential caching employs a sequential procedure that attempts to stay ahead of the host requests for reads while demoting from cache the sequentially staged data behind the host requests. For instance, during sequential caching, anticipated data can be prestaged so that a plurality of sequential tracks are stored in cache simultaneously. A sequential limiting procedure permits only a limited plurality of tracks to reside in cache memory for each domain. A bypass-cache procedure does not use the cache memory and refers the input/output requests directly to the underlying data store. An inhibit cache loading procedure uses existing copies of data blocks if they are found in cache memory but does not load any new tracks into the cache memory. The purpose of this mode is to avoid the overhead arising from track promotion when there is no benefit, such as whenever these tracks are not likely to be again accessed in the near future.

Prior Art States of Data Using a Controller Having NVS

Figure 6:
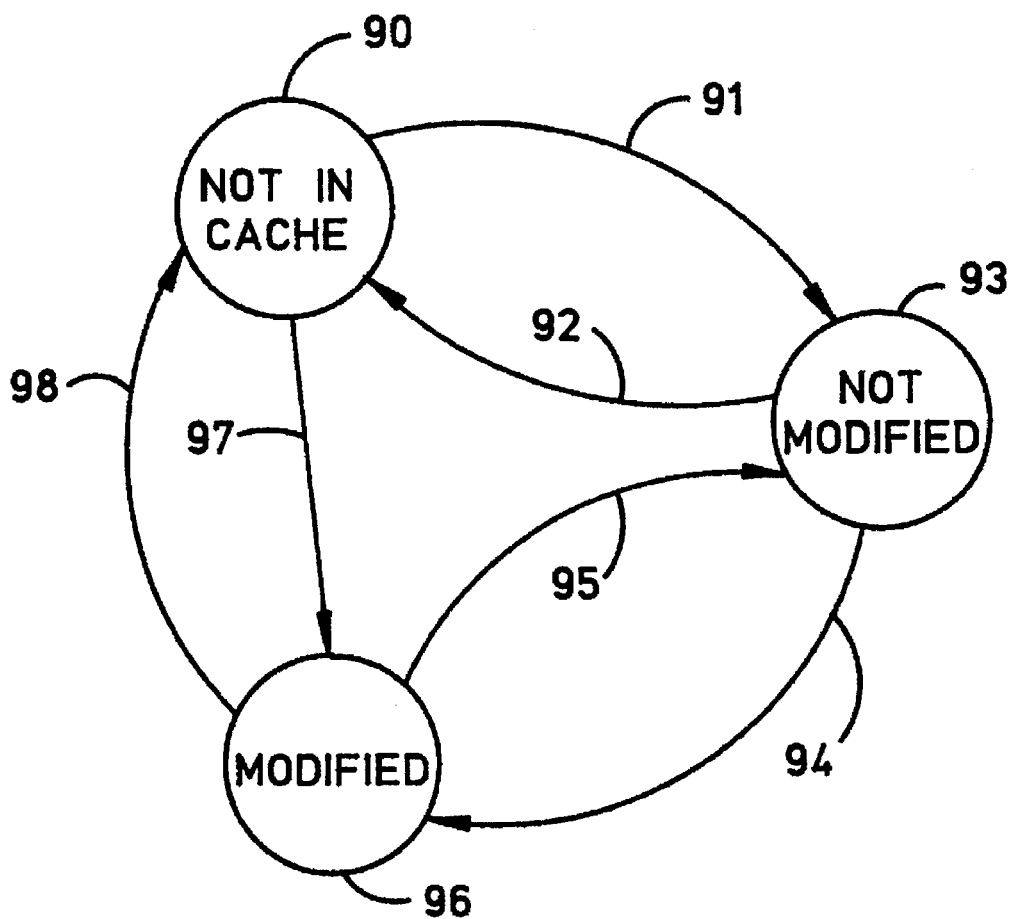
FIG. 6 is a state diagram showing the states of modified data blocks in Controller Cache Memory (CCM) in a prior art configuration using the SC of FIG. 2A.

Referring to FIG. 6, the states of modified data blocks containing track images in controller cache memory are shown as they exist in the prior art using a controller having NVS, such as SC 24a. It should be helpful to view those states enabled in a cache hierarchy without the state enabled by the present invention. The prior art enables cache hierarchy management with the existence of three states. The three states are shown in circles 90, 93, and 96, each circle hereinafter referred to simply as "states". The state 90 shows that a data block may simply be "not in cache". Following a transition path 91 indicating that the track image is staged to a controller cache, the data block containing a track image may change to state 93, as "not modified". Alternatively, unmodified data may never be written, i.e., it may be demoted from cache following transition path 92 back to state 90. A data block which is not modified may then be modified by a host computer channel initiated write operation, as shown in transition path 94. It can be seen by the preceding example that data in state 93 may transcend to state 90, or to state 96. In general, once data is in a valid state it may follow any shown transition path to another state. Returning attention to the transition path 94 leading to state 96, the state 96 corresponds to a modified data block containing a track image which is now modified and is in controller cache. This modified data block in controller cache may be destaged and committed to underlying DASD, as shown in transition path 95. Typically such destaging is done according to a cache management algorithm, such as a LRU scheme. Following transition path 92, data which is not modified but is in controller cache, as shown in state 93, may be thrown out of cache as unmodified data which has been destaged and committed to DASD. In this case, the data is not in cache according to state 90; however, following transition path 97, the data may be promoted as a result of a host write and once again reside in cache, as shown in state 96. The modified data in state 96 may be destaged from controller cache memory and committed to underlying DASD, and since the data is securely stored on DASD, the modified data may be demoted from cache from CCM 50, as indicated by transition path 98 leading to state 90. The three states available, not in cache, not modified but in cache, modified and in cache, leave the only viable alternative for ensuring data integrity as being the synchronous commit process. However, it will be appreciated by those skilled in the art for the reasons described above that the synchronous cache techniques while advantageous for data integrity, are disadvantageous in terms of performance because of associated wait times and other tying up of resources, such as NVS space.

New States of Data Using a Controller Having NVS

As can be appreciated from the above general discussion of cache operations and states of data enabled by the prior art, cache operations known in the art are not intended to manage the dual-hierarchy created by coupling CSD rack 26 to storage controller 24a. However, by adding the elements of this invention to the usual cache operating procedures, a new hierarchical cache operating method of this invention has been developed as now described in regard to a first embodiment of the present invention. Regarding terminology used in this description, a data block is used to describe a group of records that may be physical, as in CKD formatted data fields, or FBA sectors, or it may refer to logical records within physical records. Reference to a track image refers to a specific type of data block, which appears to a storage controller 24 as a group of CKD formatted general records.

Referring to FIGS. 7, 3a, 2a and 5, a new state has been enabled by the present invention. The inventors' critical recognition that the three states of the prior art were incapable of serving to improve performance of a cache hierarchy without introducing a risk of degrading data integrity has inspired the enablement of a new state for data being managed in a cache hierarchy. The new state is state 106, "destaged but not committed". This new state is enabled by the system and method of the present invention in a first embodiment, which employs a SC 24a serving a host computer channel 28 coupled to a CSD rack 26 having a plurality of CSDs exemplified by CSD 74, which includes HDAs exemplified by HDA 82 coupled to DCM 86. DCM 86 has a nonvolatile power source exemplified by a nickel cadmium battery 87. Thus, data integrity can be ensured by storing data in nonvolatile DCM 86. Since the DCM 86 is nonvolatile, it is not necessary for the SC 24a to wait for a commit reply indicating that the data has been written below to an underlying DASD unit, such as HDA 82. Additionally, the states "not in cache" 100, "not modified" 103, and "modified" 106, are all employed by the new system and method of the present invention in novel ways. It is useful to follow the state transitions beginning at state 100. A data block containing a track image may be in the state of not in cache as shown in state 100. Transition path 101 shows that the data block containing the track image may be staged to CCM 50, where the data transitions to the state 103 of not modified but in cache, as shown in state 103. The state of the data block may be stored in storage array 56. According to a least recently used priority algorithm, or any cache management algorithm known in the art, the unmodified block may be thrown out of cache and returned to state 100. Alternatively, the not modified data block in CCM 50 may be modified as shown in transition path 104. In this case, the data block is now modified and in CCM 50 as shown in state 106. The inventors having recognized heretofore unknown opportunities made available by the cache hierarchy, including nonvolatile DCM 86 having an independent power source, such as nickel cadmium battery 87 (FIG. 5), have enabled in the present invention a new state 111, destaged but not committed. The status of the data block may now show that the data block has been destaged but not committed and may also be stored in shared storage control array 56. Alternatively, such status information may be stored in CCM 50. Importantly, new state 111 enables enhancement of performance while data integrity is ensured by nonvolatile DCM 86. The new state 111 may be reached from state 106 following transition path 105 wherein the modified data block is destaged from CCM 50 to DCM 86. The modified data block which is now destaged but not committed may transition from state 111 to either of two states, state 100 and state 103. If the modified data block is written to an underlying HDA 82 and the modified data block is demoted from CCM 50 the modified data block is at that time no longer in DCM 86 or CCM 50 and is now not in cache, as shown in state 100, after following transition path 107. Alternatively from state 111 following transition path 108 the data may be written to HDA 82, but not demoted from CCM 50, according to a cache management algorithm, such as LRU priority. In that case, the data enters a not modified state 103. From state 103 the unmodified data may be thrown out of cache according to the least recently used priority scheme and will then enter state 100 once again. Data in state 100 may once again directly enter a modified state 106, by following transition path 109 wherein a modified data block containing a track image is promoted to CCM 50 as a result of a host write initiated on host channel 28.

Directory Means Data Structures Useful with a Controller Having NVS

Referring to FIGS. 8, 2a, 3a and 5, a structure of directory means 110 used to store status information is shown. Directory means 110 stored preferably in storage control array 56 or in identical 58 is used to contain status information about data blocks. However, the directory means may be stored in any storage mechanism including cache or a nonvolatile storage buffer. A scatter index table (SIT) 112 is used to create a collision chain containing index information regarding track images which is used to map these track images stored on an FBA formatted HDA 82 into electronic memory, such as CCM 50. A detailed description of a scattered index table is disclosed in U.S. Pat. No. 4,875,155 to Iskiyan et al. and U.S. Pat. No. 4,916,605 to Beardsley et al., both of which have been incorporated by reference into this patent application for the present invention. Although not particularly relevant to the present invention, the scattered index table is operated on by a hashing function, well-known in the art, to produce the collision chain, which is used to map data blocks into cache memory. Thus, a track directory entry 114 corresponding to a track image of Track_a is stored in directory means 110. Likewise, track directory images of Track_f 116, Track_b 118, Track_e 120, Track_d 124 and Track_c 126, are linked to the track detectors entry 114 corresponding to Track_a. The entries are ordered according to a least recently used (LRU) and most recently used (MRU) algorithm, as is well-known in the art, to determine priority of data for maintaining in cache memory. For example, LRU priority list 128 contains track directory entries which are arranged so that the least recently used is track directory entry 126 corresponding to Track_c. Next in order is the track directory entry corresponding to Track_e 120, and then successively arranged are track directory entries corresponding to Track_f 116, Track_b 118, Track_a 114, and Track_d 124. The track directory image for Track_c, according to least recently used conventions, is typically considered to be at the head of the LRU list 128. Correspondingly, the track directory entry corresponding to Track_d 124 is said to have an entry at the tail of LRU list 128 and is also considered to be, because of that position, the most recently used entry and would appear at the head of a most recently used list 130. The most recently used list 130 is arranged exactly opposite to the least recently used list. Thus, Track_d is the most recently used track and is therefore at the top (head) of the MRU list and the bottom/end tail of the LRU list Referring to FIG. 9, data structures which are stored in directory means 110 are shown in more detail. Status information for each track image is stored as a data block and reflects the status of records contained in each data block. A useful data structure stored in directory means 110 is a track information block (TIB). The TIB is a record level directory, in itself. The TIB has an entry for each record of that track which is in cache. That entry contains the location of the record on a CKD formatted track. This is done typically by identifying a cell number (not shown) which corresponds to physical positioning of an actual track on a physical CKD formatted device. The track image emulates this information so that it appears to the SC 24a as being locatable by using a cell number. The TIB entry for a record in cache further contains the location of the record in cache, which is shown by the line 137 pointing to the track image 142. Additionally, the TIB entry contains an indication that the record is modified and the location of such a modified record in NVS. The TIB also stores the state information and the location of the dummy record in NVS if the state is state 111, "destaged but not committed".

Referring again to FIG. 9, the preceding discussion regarding TIBs may be better understood with reference to the following examples. For example, a TIB 132 contains a TIB header 140 and a control block for each record on that track that is in cache. The header 140 contains information regarding the entire track image, and the record control block contains information about that individual record. For example, Track_a has an image 142 in CCM 50 controlled by TIB 132 which has a TIB header 140 and entries for two records, Rn and Rx. The state of the track image is state 106, "modified", and this information is stored in the block 138. Record Rn has control information about it stored in block 136, and similar control information about the record Rx is stored in block 134. The control information regarding Rn includes a linked pointer 137 that gives the starting address in CCM 50, shown as block 144 in image 142. Indication 133 shows that the record has been modified and pointer 139 to the back-up copy of the modified image of Rn is stored in block 170 of NVS data block 168.

For purposes of showing an example of status information to identify the state of a modified data block as destaged but not committed, the TIB 148 is illustrated in FIG. 9. In identical fashion to TIB 132, TIB 148 has TIB header 150 that contains status information regarding a track image. The state of the track image is state 111, "destaged but not committed", and this information is stored in block 152. Indicator 153 shows that the record Rq stored in block 154 has been modified. The pointer 149 links to the starting address in CCM of record Rq that has its image stored at block 162 in the Track_b image 160. Note, there is no linked pointer to NVS for record Rq. Thus, it can be seen that no back-up copy is kept in NVS of a record belonging to the Track) image. Any NVS space which had been dedicated to Rq, prior to the track image entering the state of "destaged but not committed" is reclaimed by methods enabled by the present invention. However, in the NVS data block 168 at block 172 it can be seen that a dummy record is stored to indicate that at least one record of the modified track image of Track_b has been destaged but not committed. This dummy record can then be used in the method of the present invention for both NVS space reclamation and recovery in the event of a failure of CCM 50.

Figure 10:
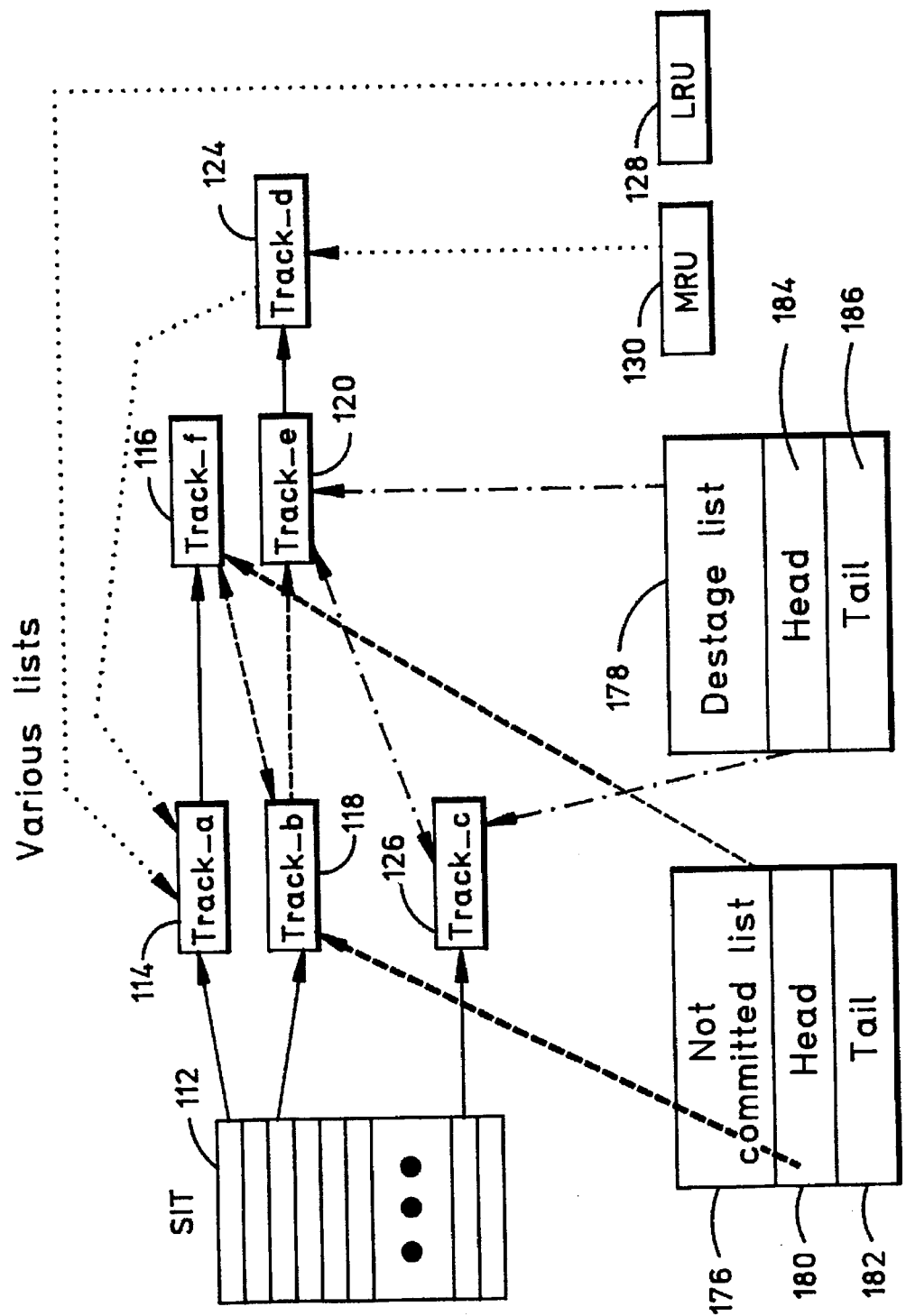
FIG. 10 is another illustration of the directory means of FIG. 8 including a "Not committed list" and a "CCM destage list" stored in the directory means for maintaining the status of data blocks.
Figure 11:
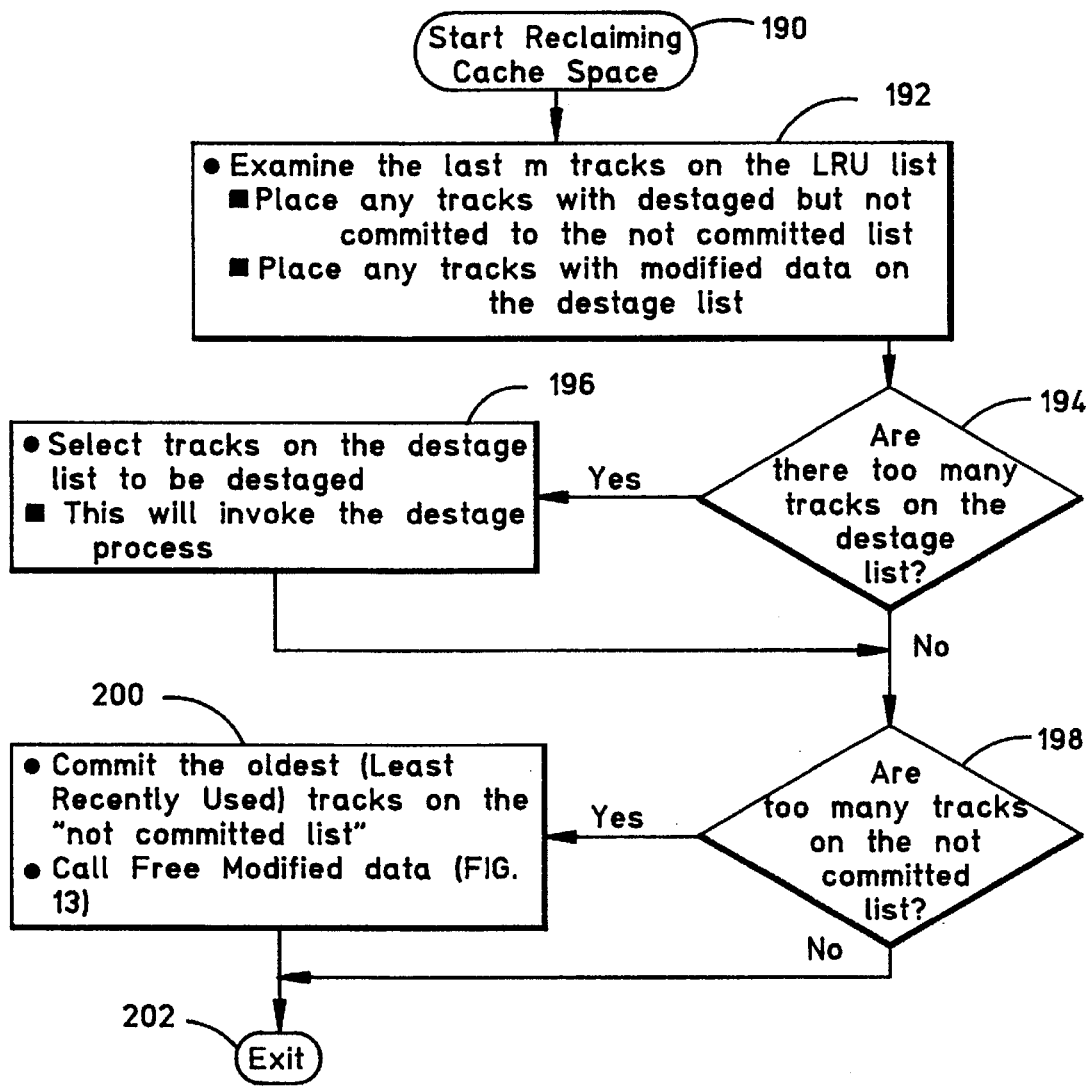
FIG. 11 is a flow chart illustrating a method of CCM space reclamation using the lists stored in the directory means shown in FIG. 10.

Referring to FIGS. 10 and 3, the directory means 110 is shown again wherein like numbers indicate the same element as identified in previous drawings, status lists enabled and employed by the present invention are illustrated. A "Not committed list" 176 is illustrated as containing the modified data blocks containing an image of each track which has met predetermined criteria of having been destaged from CCM 50 but no commit reply has been returned to SC 24a. The head 180 of Not committed list 176 may contain, for example, the track directory entry 118 containing an image of Track_b and the tail 182 of the list may contain, for example, the track directory entry 116 containing an image of Track_f. Similarly a "Destage list" used by the present invention to identify those modified data blocks that are to be destaged from CCM 50 in accordance with the present invention can be seen, as having entries including head 184 containing the track directory entry 126 which stores an image of Track_c, and the tail 186 containing the track directory entry 120 which has an image of Track_e. The Destage list 178 is a subset of the LRU list 128, and the Not committed list 176 is a further subset of the destage list. Thus, the present invention combines a LRU algorithm known in the art with a destage list also known in the art and new status information contained in directory means 110 to create a Not committed list which is used in a new way by the system and methods of the present invention. The methods employed by the system of the present invention will be better understood by reference to the remaining figures in this disclosure describing the methods enacted by the present invention.

Figure 7:
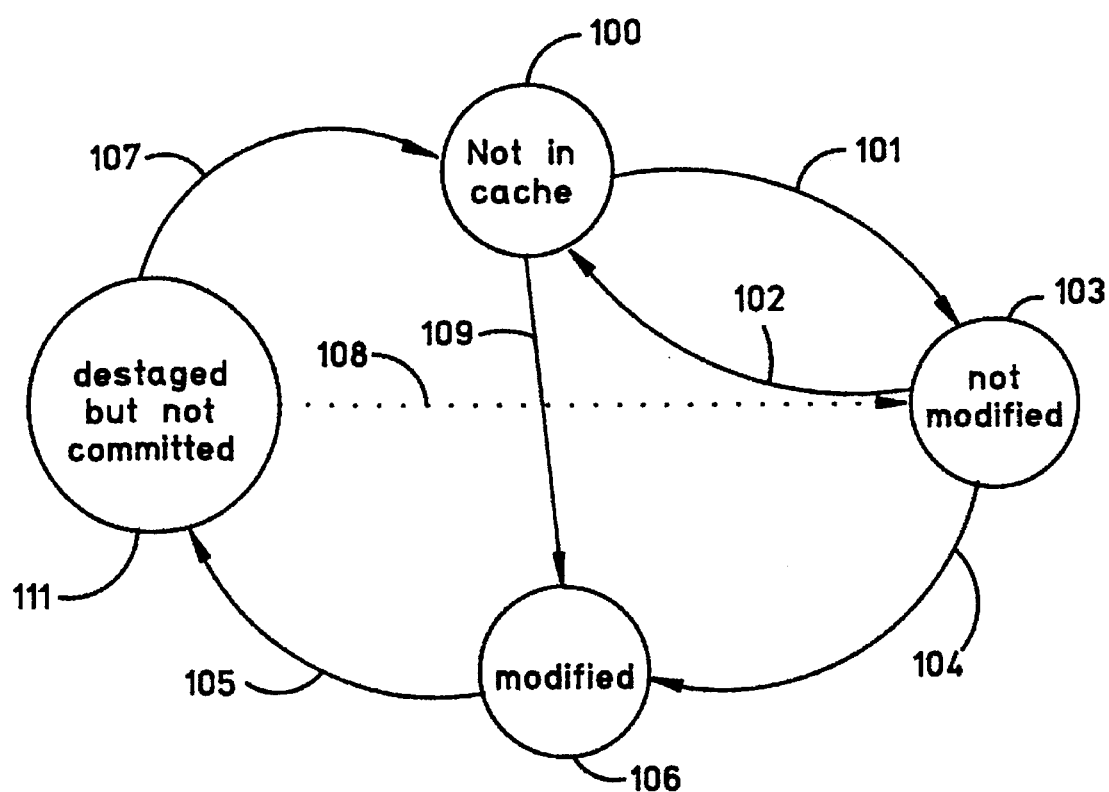
FIG. 7 is a state diagram showing the states of modified data blocks in CCM enabled by the present invention using the SC of FIG. 2A.

In general, the following information is kept in directory means 110 concerning data which may be stored in cache and corresponds to states shown in the state diagram illustrated in FIG. 7, such that if the state is 100 "not in cache" then nothing is kept in the directory means. However, if the state is 103 "not modified" then for each record on track image stored in CCM 50 the following information is retained: the location in CCM 50 of the record, and the location on HDA 82 of the record belonging to the track image. Additionally, for state 103 wherein a data block is not modified the position of the data block on the least recently used list 128 is also retained. Additionally, other information not pertinent to this invention can be retained for control purposes. In the case of data which is modified as shown in state 106, information is kept to indicate all that which has been described before for the "not modified" state 103. Additionally an indication of which fields are modified, i.e., which records have been modified is retained and for each record with modified fields a location in NVS 52 is also retained. The location identifier for NVS is of a back-up copy of any records which have been modified in the track image. If the state is state 111, destaged but not committed, then all of the information which was kept for the "not modified" state is retained and additionally an indication of which fields are modified is retained and a location in NVS of the dummy record which indicates that the track image has been destaged but not committed is also retained. This information is used to determine the status of each track image and moreover each record contained within the track image. Since records which are modified and destaged to DCM 86 but not committed to HDA 82 can be treated as committed data had been treated in the prior art. This is specifically made possible by nonvolatile DCM 86 so that the requirement that two copies of modified data with one in nonvolatile storage will always be maintained. In this way, it can be seen that SC 24a need not be placed in a wait state until a synchronous commit reply is received. In this fashion commit replies are returned to SC 24a when data is destaged from DCM 86 to HDA 82 but destages can occur as part of NVS and cache space reclamation rather than as a forced reaction to a destage from CCM 50. In this way, performance of the entire system 20 is improved because host computer channel 28 can be used for write operations without having to wait on a commit reply before ending a destage of data from CCM 50, and thus SC 24a allows the write operation to proceed.

Cache Space Reclamation Useful with a Controller Having NVS

Referring to FIGS. 1, 3a, 5, 9, 10, and 11, the method of cache space reclamation in the first embodiment of the present invention can be seen. Regarding the preferred embodiment of the present invention, the method steps are carried out by an interaction of microcode 67 which is part of microprocessor 68 and elements belonging to system 20. Microprocessor 68 is coupled to directory means 110 stored in shared control array 56. Further, in a preferred embodiment microprocessor 68 is part of SC 24a. Thus, the method steps described in the flow charts in this document are understood to be carried out by microprocessor 68 in combination with stored information in directory means 110 and enacted on by various elements of large distribution processing system 20. Primary emphasis is on the effects of cache management techniques enabled by microcode 67 in microprocessor 68 on the CSD rack 26 containing a plurality of drawers such as drawer 74 having DCM 86 and HDAs 82, and especially the improved performance of SC 24a and the ability to reclaim space in NVS 52. The cache space reclamation begins in step 190. Microcode 67 examines the last, for example, "m" tracks on the LRU list to determine those tracks which can be placed on a destage list 178 and those tracks which can be placed on a Not committed list 176. Examining the last "m" tracks on the LRU list is well known in the art as is well known to placing the tracks with modified data on a destage list, indicating this data is to be destaged from cache. However, in a new way the destage list in combination with status information stored in directory means 110 such as the status information in TIB 148 is used to indicate that a particular modified track image been destaged from CCM 50 to DCM 86 but is not committed as shown, for example, in block 152 of TIB 148 for Track_b. Those track images which have been destaged but not committed are then added to the Not committed list which is a subset of the larger LRU list 128. In step 194 microcode 67 checks to see if there are too many tracks for modified data blocks containing track images on the destage list 178. If the answer to this inquiry is yes then the tracks on the destage list to be destaged are selected as shown in step 196. This has the effect of invoking a destage process which is enabled by the present invention and will be described below in reference to FIG. 12. In either case, the flow returns to step 198 in cache space reclamation at which time the number of modified data blocks containing track images on the Not committed list are checked to determine if any of these tracks can be committed to HDAs 82 and a commit reply returned to SC 24a. Assuming there are too many tracks on the Not committed list, processing returns to step 200 where the oldest or LRU track images on the Not committed list are committed. As part of the present invention, a subroutine identified as call free modified data and described below in FIG. 13 is then called and the subroutine for space reclamation in cache can be exited as shown in step 202.

Figure 12:
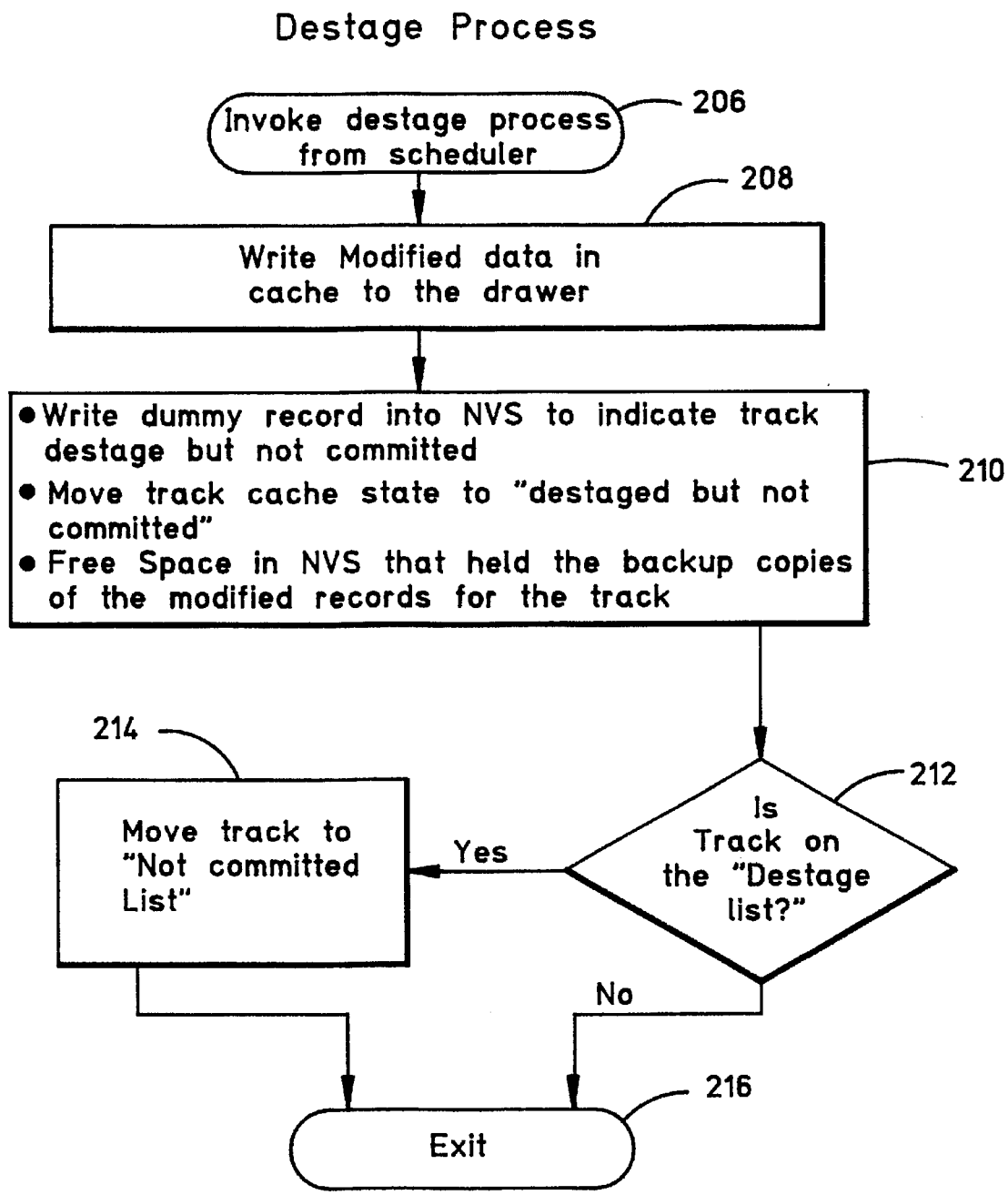
FIG. 12 is a flow chart illustrating a method of destaging modified data blocks using the status information shown in FIG. 9 and the status lists shown in FIG. 10.
Figure 13:
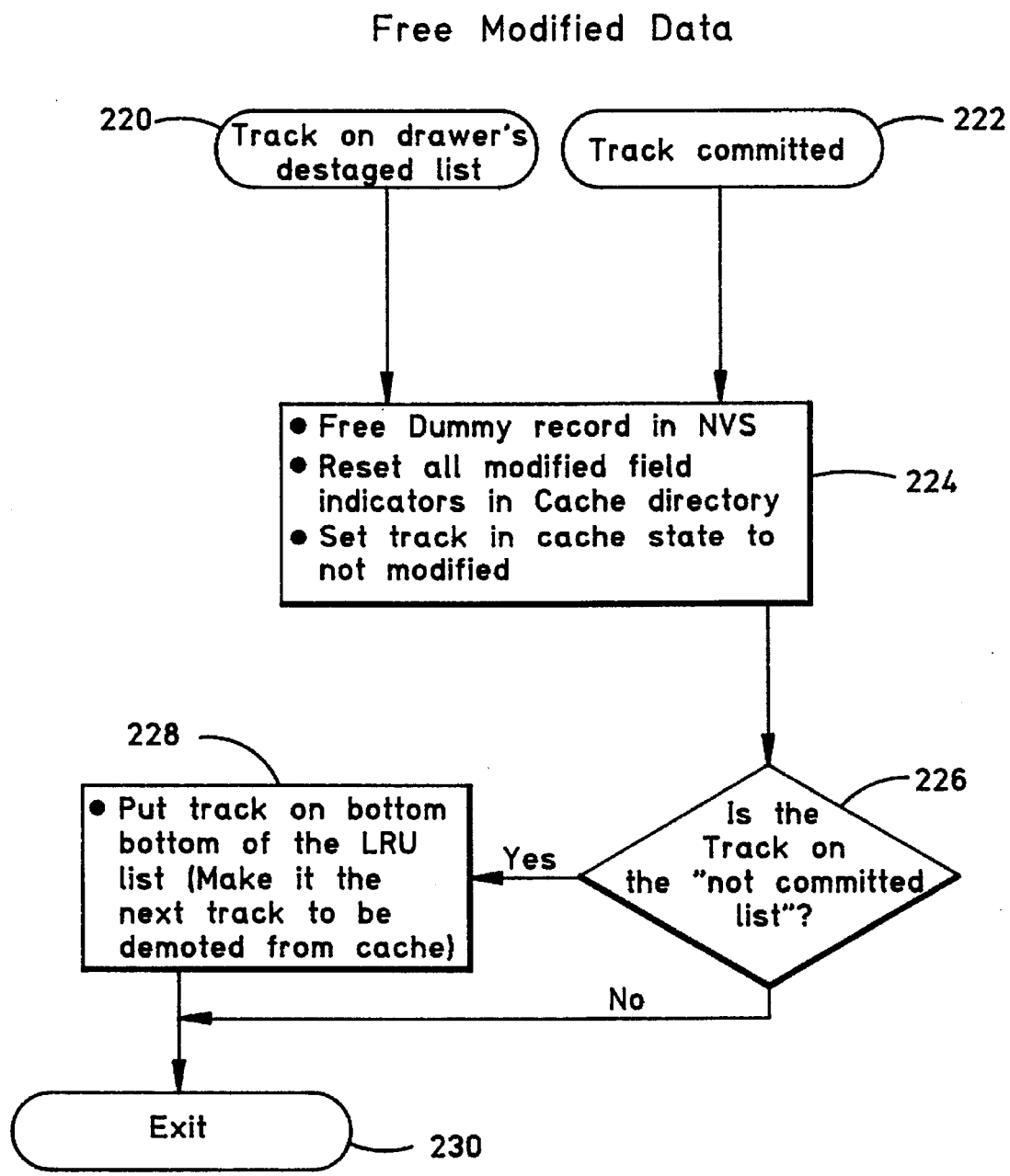
FIG. 13 is a flow chart illustrating a method of freeing modified data enabled by the status lists shorn in FIG. 10, the status information shown in FIG. 9, and the method of destaging modified data shown in FIG. 12.

Destage Process Enabled by Present Invention Useful with a Controller Having NVS Referring to FIGS. 9 and 12, a destage process in system 20 is carried out in a new fashion enabled by the present invention. In an IBM 3990 the destage process is normally invoked from code identified as scheduler code. This scheduler code also identified as the device manager resides as part of microcode 67 in microprocessor 68. Thus the destage process begins when it is invoked from scheduler code, as shown in step 206. When the destage process is invoked modified data is destaged from CCM 50 to DCM 86. Implicitly, a host channel initiated write operation must have occurred in the background before the data is modified. Once the data is destaged from CCM 50 to DCM 86, then processing continues to step 210. In step 210, a dummy record is written into NVS 52 to indicate that the track image is destaged but not committed. This dummy record is the general case of the example shown in NVS block 168 in block 172 wherein the example shows a dummy record for a track image which was destaged but not committed. This dummy record will be used both to indicate that the space may be reclaimed by NVS space reclamation management and also in the event of recovery from, for example, a power outage during a destage operation. Next in step 210, the modified track image in CCM 50 will be set to the state of "destage but not committed", as shown for example in TIB 148. Data space that had been allocated to a back-up copy of the modified data block that has been destaged to DCM 86 can now be freed in NVS 52, as shown in step 210. In step 212 a check is made to determine if the track image is on the Destage list 178. If it is not on the Destage list then it is not the optimal time to demote that data and the destage process is exited in step 216. However, if the data block is on the Destage list, then the track image is moved to the Not committed list 176, as shown in step 214.

Figure 14:
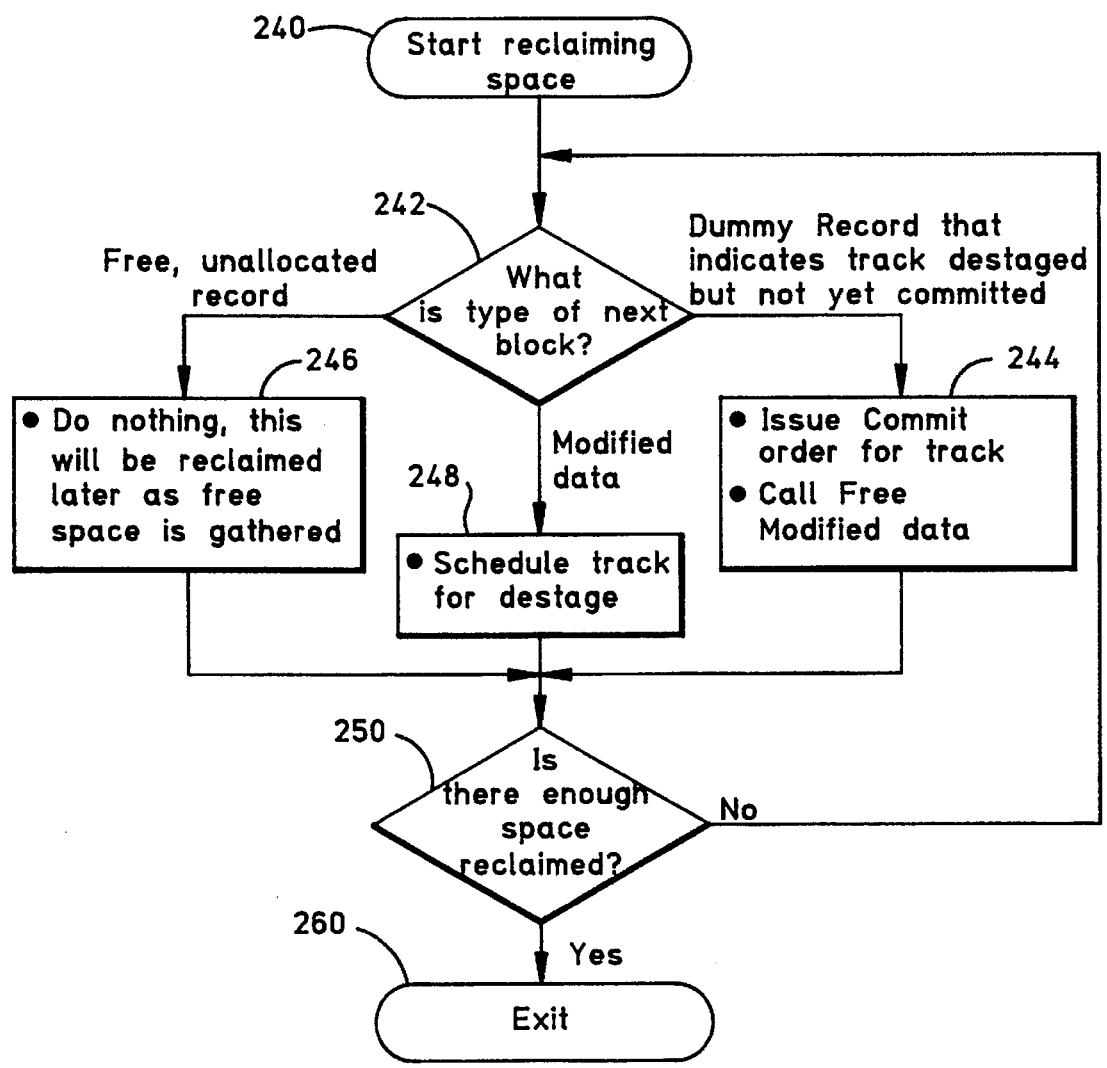
FIG. 14 is a method of NVS space reclamation using the lists stored in the directory means shown in FIG. 10, the status information shown in FIG. 9, and the method of freeing modified dam shown in FIG. 13.

Generally, the second embodiment of the invention enables asynchronous commits and allows destaging to occur as a function of cache in NVS management; however, in some instances the inventors have recognized that it will necessary to force a commit and force the destage of the data from DCM 86 to HDAs 82. For example, if cache space, such as CCM 50 space, is unavailable then an explicit host channel 28 implemented command may force the track image to be destaged. Additionally, a host implemented channel command may initiate a write operation to a track image which is in the "destaged but not committed" state 111. In this case, the data block is immediately written to HDAs 82 and a commit reply is sent to SC 24a. In this way, data integrity is not sacrificed for the sake of performance and the forced destage ensures recovery in the event of a failure (e.g., a power outage). Also, normal cache management may determine that the Not committed list has received too many entries and in this case microcode 67 may force the least recently used entries on the Not committed list to be committed to HDAs 82 and a commit reply sent to SC 24a. One other reason, which will be described in more detail below with specific reference to FIG. 14, is that as part of NVS space reclamation a dummy record indicating that a track image has been destaged but not committed is encountered. Also related is that the DCM is managed in a LRU priority fashion such that in order to make room on DCM data may be destaged. In this case the CSD will maintain a drawer destaged list containing those track images which have been written to HDA and a commit message has been sent for these to SC 24a as well.

Freeing Modified Data Useful with a Controller Having NVS

Referring to FIGS. 13, 10, 9, and 3a, a method for freeing modified data in CCM 50 and NVS 52 is described. Space may be reclaimed if the track image belongs to a modified data block which is on a DCM destaged list as shown in step 220 or has been committed as shown in step 222. The DCM destaged list is created in response to data destaged from DCM according to an LRU priority list within the DCM. Thus this represents data that has been destaged without an explicit commit from the SC 24a. In either case the dummy record allocated in NVS block 168 may be removed since it is no longer needed. Additionally, in step 224, all modified field indicators in cache directory means 110 may be reset to indicate that the track image is now no longer considered modified and has been committed. In step 226 a check is done by microcode 67 to determine if the track image is on the Not committed list 176. If the data is on the Not committed list then the track image is placed on the bottom of an LRU list, such as LRU list 178, shown in step 228. The dam has completed destage. It is no longer modified and it is therefore not subject to destage. By placing it as an unmodified track entry on the bottom of the LRU list, the cache space allocated to it will be reclaimed by microcode 67 when needed. The free modified data process exits at this point in step 23.

NVS Space Reclamation

Referring to FIGS. 14, 10, 9, and 3a, NVS space reclamation is described. A few words, regarding general space reclamation which is part of the IBM 3990 control unit, are in order. Space reclamation runs in two processes. The first process is a scan ahead process which ensures that enough data is scheduled for destage so that there is enough free space to turn into allocable space. This process is described in the flow chart shown in FIG. 14 and described below. Generally, garbage collection is the second process which extends the allocable space by appending any free space that directly follows it. With this in mind, the NVS space reclamation of the present invention uses known techniques combined with the new system and status information and the methods described in the above flow charts. All data blocks in NVS are linked together so that the next NVS data block may be checked as shown in step 242 following start step 240 which starts the reclamation process. If a dummy record is encountered indicating that the data block has been destaged, but is not yet committed to underlying HDA, and having a commit reply sent to SC 24a, then step 244 is enacted. In step 244, in response to encountering the dummy record a commit is issued for the track image, and the free modified data process is called by microcode 67. As described above, this is one of the situations in which the track image will be committed because in this case it is entirely appropriate to free both NVS and cache space. The free modified data process is described above with the description of FIG. 13. Next a check is done in step 250 to determine if enough space has been reclaimed. If the answer to this is yes then NVS space reclamation as used with the present invention is completed. However, if enough space is not reclaimed then processing continues back to step 242. In step 242, if a modified data block is encountered then this track image is scheduled for the destage process as shown in step 248. In this case the destage process would then be invoked at a time determined by the scheduler as shown in step 206 of FIG. 12. In the situation where a free unallocated record is encountered then this will be reclaimed later as free space gathered by normal NVS space reclamation, as shown in step 246. Processing ends in step 260 once enough NVS space is reclaimed.

Prior Art States of Data Using a Controller without NVS

Figure 15:
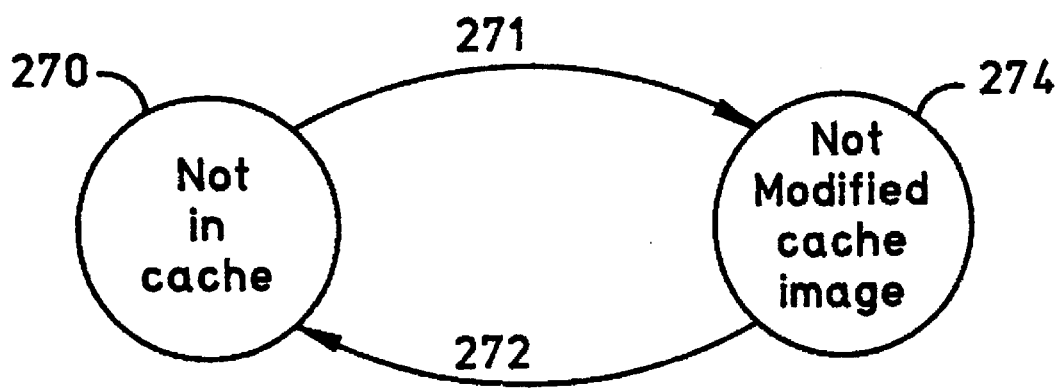
FIG. 15 is a state diagram showing the states of data blocks in CCM in a prior m configuration using the SC of FIG. 2B.

Referring to FIG. 15, the states of data blocks or track images in controller cache memory are shown as they exist in the prior art using a controller without NVS, such as SC 24b. The prior art enables cache hierarchy management with the existence of only two states on a controller without NVS. The two states are shown in circles 270 and 274, each circle hereinafter referred to simply as "states". The state 270 shows that a track image may simply be "not in cache". Following a transition path 271 indicating that the track image is staged to a controller cache, a track image may change to state 274 identified as "not modified cache image". Following transition path 272 an unmodified track image may be removed from cache according to an LRU algorithm. Since there is not a nonvolatile storage mechanism in the SC 24b, modified data cannot be kept in CCM 51 without compromising data integrity. This is because a sudden power interruption would cause an immediate loss of all data. The two states available "not in cache" and "unmodified in cache" leave the only viable alternative for ensuring data integrity as forcing a write to an underlying HDA, such as HDA 82. However, it will be appreciated by those skilled in the art for the reasons described above that while writing to the HDA is advantageous for data integrity it is disadvantageous in terms of performance because of associated wait times and other tying up of resources and in particular with regard to the RAID write penalty discussed above.

New States of Data Using a Controller without NVS

As can be appreciated from the above general discussion of cache operations and states of data enabled by the prior art, cache operations known in the art are not intended to manage the dual hierarchy created by coupling CSD rack 26 to storage controller 24b. However, by adding the elements of this invention to the usual cache operating procedures, a new hierarchical cache operating method of this invention has been developed and is now described in regard to a second embodiment of the present invention. Referring to FIGS. 16, 3b, 2b and 5, two new states have been enabled by the present invention. The inventors' critical recognition that the two states of the prior art were incapable of serving to improve performance of a cache hierarchy without introducing a risk of degrading data integrity has inspired the enablement of two new states for data being managed in a cache hierarchy. The two new states are state 286, "modified cache image", and state 288, "write miss data". These two new states are enabled by the system and method of the present invention in a second embodiment, which employs a SC 24b serving a host computer channel 28 coupled to a CSD rack 26 having a plurality of CSDs exemplified by CSD 74, which includes HDAs exemplified by HDA 82 coupled to DCM 86. DCM 86 has a nonvolatile power source exemplified by a nickel cadmium battery 87. Thus, data integrity can be ensured by storing data in nonvolatile DCM 86. Since the DCM is nonvolatile, it is not necessary for the SC 24b to wait for data to be written below to an underlying DASD unit such as HDA 82. Additionally, the states "not in cache" 270, "not modified in cache" 274, and the two new states are all employed by the new system a method of the present invention in novel ways.

It is useful to follow the state transition beginning at state 274, as the state 270 and transition path 271 have been described in sufficient detail above. A track image which is not modified may be in cache and therefore in the state of "not modified cache image", as shown in state 274. Transition path 283 shows that the unmodified track image may then be modified by a host computer channel 28 implemented write operation so that the track image is modified in CCM 51 and in DCM 86. This transitions the track image to the state "modified cache image", as shown in state 286. The state of the track image may be stored in CCM 51 or 53 in a preferred embodiment of the second embodiment. Alternatively, storage array 55 or 57 may be used for storing such status information. Following transition path 284, the data may be written to an underlying HDA so that the state of the data block is now a "not modified cache image", state 274. Following transition path 272 the unmodified cache image may be removed from cache according to a LRU algorithm. Of course, data may follow any valid transition path to a valid transition state at any time. It should be noted that it is preferable to leave a track image which is modified in cache in order to increase the possibility of getting a cache write hit, in the second embodiment of the present invention. Returning to the state diagram, the data following transition path 272 is now back to the original state of 270, "not in cache". From this point the data may be staged to cache, typically due to a host computer channel 28 initiated action, such a read operation, or the data may enter a state indicated by transition path 275. Transition path 275 indicates that a host computer channel 28 implemented write action results in a write miss because the data is in the state "not in cache" 270. Thus, the new state of the data block is "write miss data", as denoted by state 288. In order to ensure data integrity such data may then be directly written to HDA following transition path 276, wherein the data block again resides in the state of "not in cache", as shown in state 270.

Directory Means Data Structures Useful With a Controller Not Having NVS

Referring to FIGS. 17, 2b, 3b, and 5 a structure of directory means 310 used to store status information is shown. Directory means 310 stored preferably in CCM 51 or in identical CCM 53 is used to contain status information about data blocks. Since CCM 51 is identical to CCM 53, a reference to CCM 51 alone should be understood to indicate that CCM 53 can be referenced as well. However, the directory means may be stored in any storage mechanism including shared control array 55 or 57. A scatter index table (SIT) 312 is used to create a collision chain containing index information regarding track images which is used to map the track images stored on an FBA formatted HDA 82 into electronic memory, such as CCM 50. A detailed description of a scatter index table is disclosed in U.S. Pat. No. 4,875, 155 to Iskiyan et al. and U.S. Pat. No. 4,916,605 to Beardsley et al., both of which are incorporated by reference into this patent application for the present invention. Although not particularly relevant to the present invention, the scatter index table is operated on by a hashing function, well known in the art to produce a collision chain which is used to map data blocks into cache memory. A device array 400 is a one-dimensional array containing 64 elements, each element corresponding to one of 64 logical DASD devices. For example, block 378 corresponds to device 0, block 380 corresponds to device 3, and block 384 corresponds to device 63. The directory means 310 relates three entities to each other: modified track images, cache space represented by space control blocks (SCBs) and data control blocks (DCBs) containing information on how to write track image data to cache. Each DCB relates track images and corresponding SCBs. A modified track image can be related to one or more SCBs. This represents one or more updates to the track image using one or more CCM 51 or CCM 53 space allocations. An SCB can be related to one or more track images. Each track that has been modified by using the cache space is related to the SCB. There can be more than one track related to a particular SCB in the case of a multi-track image update write. Because a track can be updated multiple times using the same SCB, there can be multiple incidences of the track SCB relationship in the directory means 310.

Figure 16:
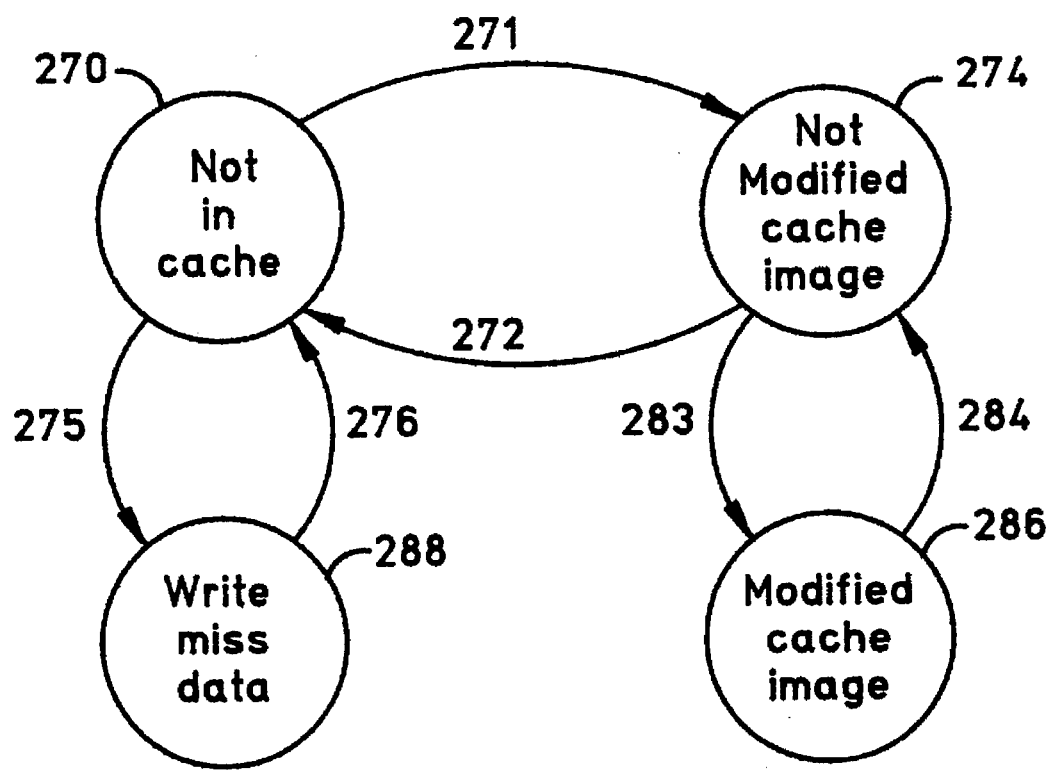
FIG. 16 is a state diagram showing the states of data blocks in CCM enabled by the present invention using the SC of FIG. 2B.
Figure 17:
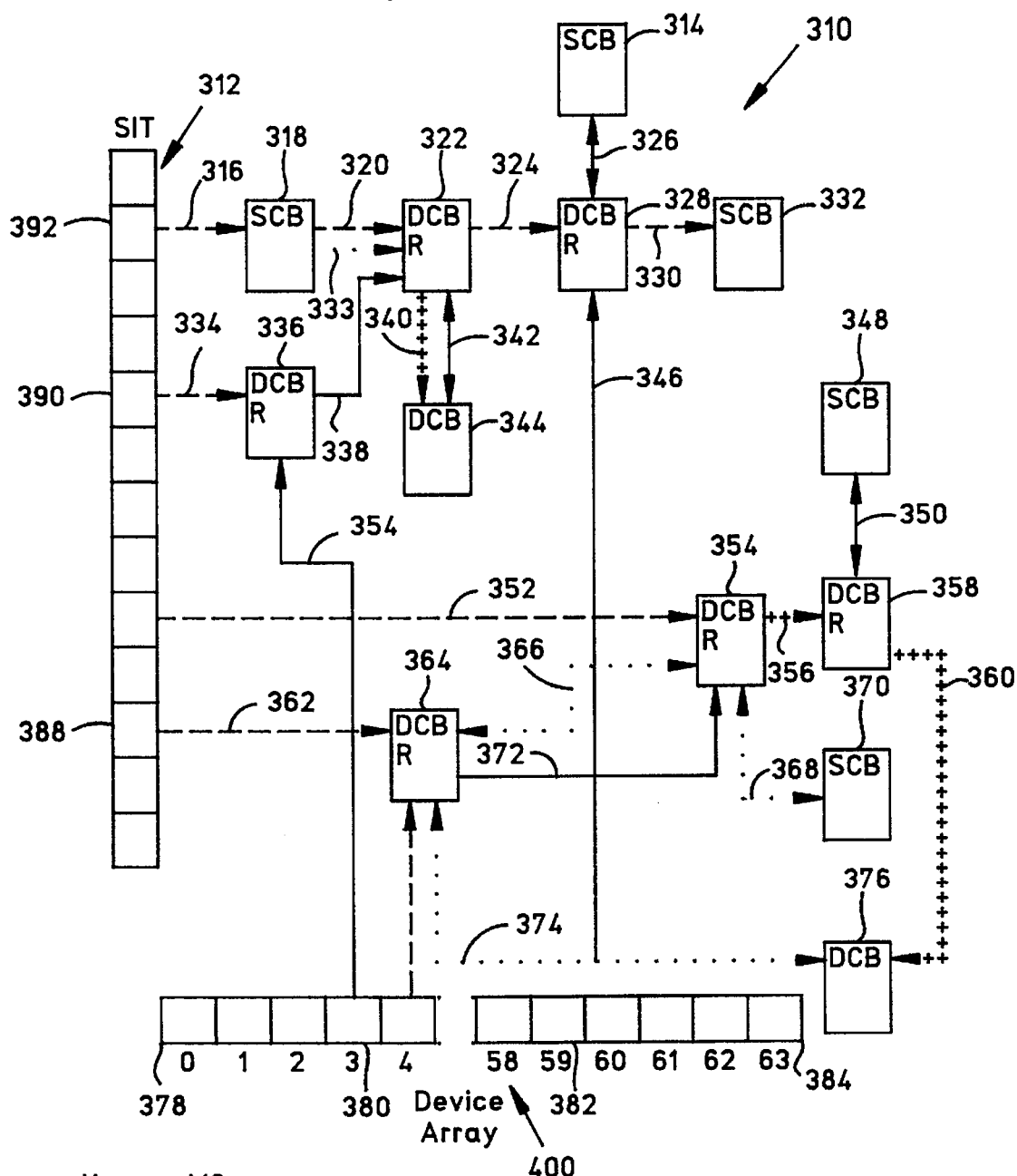
FIG. 17 a diagram illustrating a directory means coupled to the CCM and data structures contained within that directory means that are employed by the present invention and used with the SC of FIG. 2B.
Figure 18:
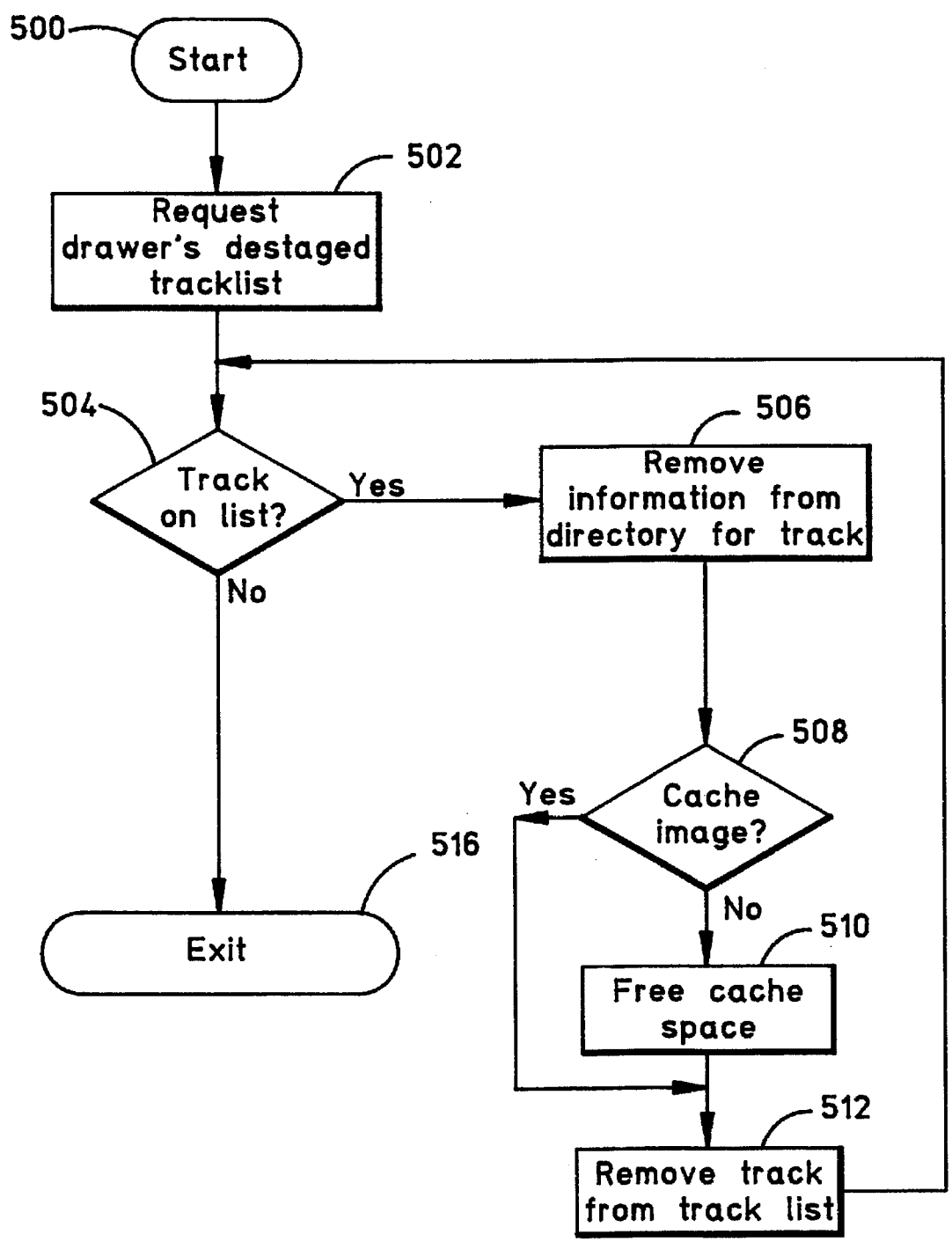
FIG. 18 is a method of CCM space reclamation using the directory means shown in FIG. 17.
Figure 19:
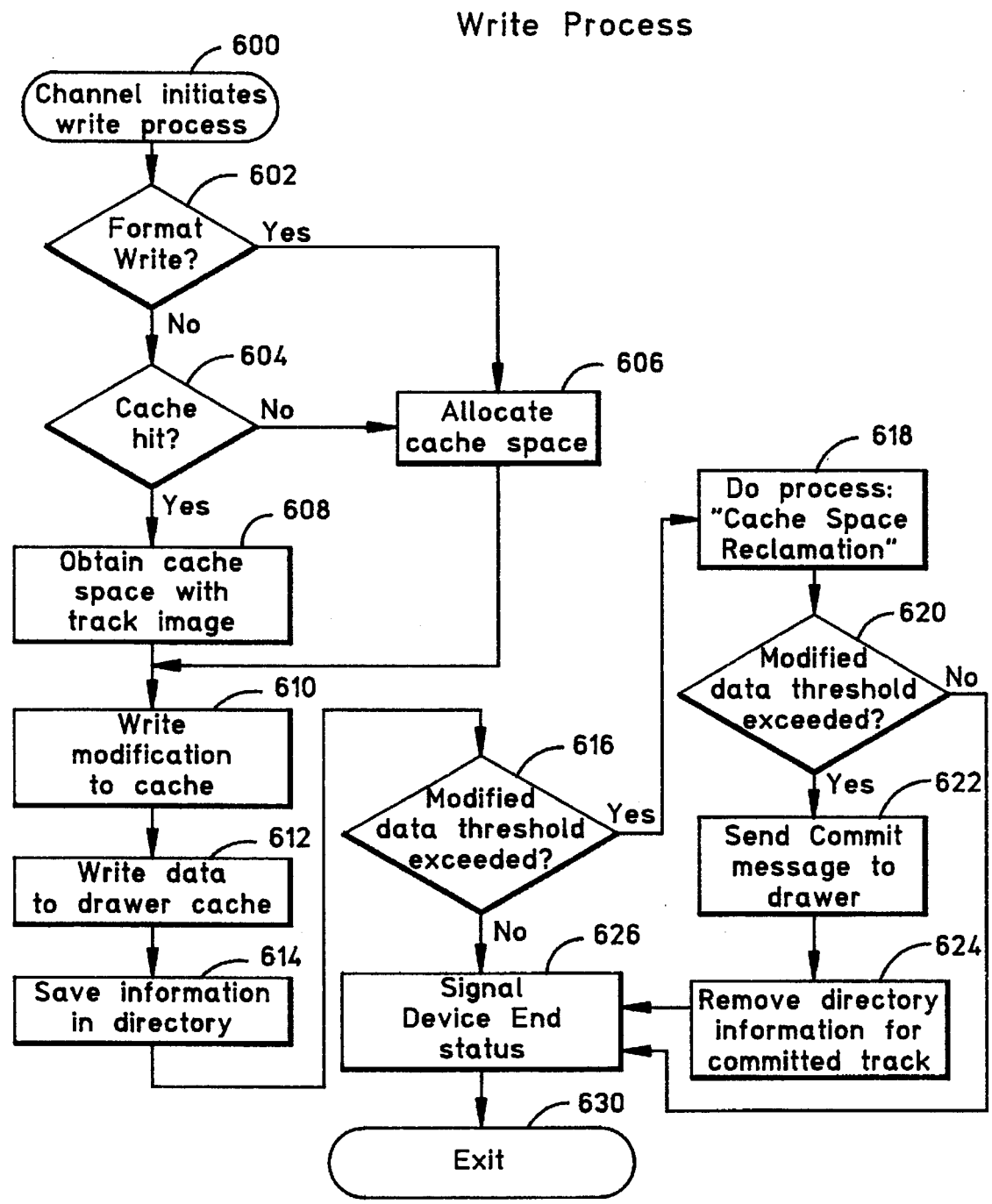
FIG. 19 is a flow chart illustrating a method of modifying a data block enabled by the present invention and employing the directory means of FIG. 17 and the method of FIG. 18.

Referring to FIGS. 16 and 17, the following information is kept in directory means 310 and corresponds to states shown in the state diagram illustrated in FIG. 16. Thus if the state is 270 "not in cache" then nothing is kept in the directory means. However, if the state is 274 "not modified in cache" then for each track image the following information is retained: the location in CCM 51 or 53 of the track image, the location of the track image on HDA 82, and the position of the track image entry on a least recently used list. The least recently used list is identical in structure to LRU list 128 identified as used with SC 24a. The above described information identified for a track image which is in state 274 is the information which is stored in an SCB. However, if the state is 286, a modified cache image, then the information corresponding to an SCB is retained as well as the information corresponding to a DCB. The information corresponding to or contained in a DCB is the beginning and ending cell number of a track image modification in orientation and search parameters of the modification of the track image of interest. The cell number corresponds to the image of the track which is kept in a CKD format, well known in the art. The cell number is a prescribed number of bytes which identifies the physical positioning on a track and thus identifies the exact location of a modification in a track image. Since the data field in a CKD format record may cover many cells it is extremely useful to keep up with which cell numbers are being written so that if a cell number is overwritten it is not necessary to keep up with the further modifications to the same cell number since this cell number is said to be eclipsed or overwritten. Thus the DCB is useful for keeping up with which cell numbers of the track image have been modified. If the state of the data is 288 or "write miss data" then information corresponding to a DCB as described before for the state of "modified cache image" 286 is kept. Since the track image is not in cache it is not useful to keep up with the SCB identified information for a track image in state 288.

The Data Control Block (DCB) and SCB Structures

The Data Control Block (DCB) contains the information needed to recover the uncommitted data in the event of an error that prevents the CSD from writing the data to the HDA. In particular, the DCB contains the parameters necessary to send a request to re-write the data to the drawer. This service allocates a new DCB, copies the parameters to it, and associates the DCB with the CCM space containing the uncommitted data.

The DCB is preferably 96 bytes in size and resides in the CCM 51. Like the SCB, the DCB is divided into three 32-byte parts: a part common with the SCB and two DCB unique parts. A preferred embodiment of the DCB structure follows. The common area of the DCB contains the following fields:

1. SCB structure name
2. SCB DCB control flags
    a. SCB_Type (This bit is common to both SCBs and DCBs.)
3. BMF Hash Index (4 bytes)

4. Hash Conflict Frwd Link (4 bytes)

5. Hash Conflict Bckwd Link (4 bytes)

6. Cached Device Address and HH (the device address identifies a logical DASD device and HH defines a head number)

7. Current CC (the CC defines a cylinder number for a logical DASD device)

8. DCB List Forward Ptr (4 bytes)

9. DCB List Backward Ptr (4 bytes)

The SCB DCB Control Flags are preferably defined as follows for the DCB:

1. This Space Recovering

2. Root DCB

3. DCB Reserved (used for the SCB Type flag)

DCB Unique Structure, Part 1: Bytes 32–63 of the DCB preferably contain the following fields:

1. Track List Forward Ptr (4 bytes)

2. Track List Backward Ptr (4 bytes)

3. Same Track Forward Ptr (4 bytes)

4. Same Track Backward Ptr (4 bytes)

5. DCB SCB Ptr (4 bytes)

6. DCB First Cell Number

7. DCB Last Cell Number

DCB Unique Structure, Part 2: Bytes 64–95 of the DCB preferably contain the following fields:

1. DCB Request Code

2. DCB DMF Request Flags

3. DCB Sector

4. DCB Search Mode

5. DCB Search Cell Number

6. DCB Search CC

7. DCB Search HH

8. DCB Search Record

9. DCB Transfer Count

10. DCB Record Length

11. DCB Buffer Address

12. DCB Starting CC

13. DCB Track Map

Referring to FIG. 17, the directory means 310 can be further thought of as a collection of DCBs. Each DCB represents the relationship between one modified track image and one SCB. The directory also relates DCBs to each other. DCBs are related to each other when they represent relationships involving the same track image and/or the same CCM 51 space.

Furthermore, when DCBs are related to each other, because they represent modifications to the same track image, then the DCBs are ordered in a DCB list by the time that the modifications to the track image are made. All DCBs related to track images on the same device, such as device 3 shown in block 380, are related to each other. Again referring to FIGS. 17, 3b, 2b, and 5, the directory means further includes a DCB list which can be best understood by reference to key line 410, and a hash conflict with key line 412, a track list key line 414, and a same track list key line 416. The directory means shown in FIG. 17 may be best understood by referring to each key line to understand specific examples of which elements shown belong to which of the aforementioned lists. For example, line 316 shows that SCB 318 is identified as belonging to a hash conflict list. Likewise, DCB 322 pointed to by line 320 is a member of the same hash conflict list and lines 324 and 330 identify DCB 328 and SCB 332 as belonging to the same hash conflict list. This is because each of the SCBs and DCBs is shown on a collision chain emanating from SIT table entry position 392. When two or more DCBs exist for the same track, one DCB is designated as the root DCB. Thus, DCB 322 is identified as the root DCB for a track image. The DCB 328 is also designated as a root DCB, and this means that DCB 328 must exist for a track image other than the track image to which DCB 322 serves as the root DCB for. However, following line 340 indicating that DCB 344 is on the same track list as DCB 322, it can be seen that these two DCBs belong to the same track image. Thus, the hash conflict list denoted by key line 412 is useful for identifying both SCBs and DCBs. From the above example it can be seen that only one DCB for a given track appears in the SIT table. It can also be seen that if more than one update is made to the same track image the DCBs are linked together by the same track list. Preferably the same track list is a singlely-linked list, and new DCBs are added at the end of the list while old DCBs are removed from the front of the list. Thus, in a preferred embodiment the order of the same track list is significant. The most recent updates are at the end of the same track list. When updates are to be reapplied, they are taken from the front of the list, thereby applying the updates in the order in which they are received. The track list connects all root DCBs belonging to the same device. This provides a convenient mechanism for locating all updates for a device.

Again referring to FIG. 17, there are 64 track lists in a preferred embodiment, one for each device. The DCB list links a DCB with the SCB controlling the CCM 51 space of concern. Thus, for example, DCB 336 is shown linked to DCB 322 on a track list for device 3 identified in block 380 of the device array. Also, for example, DCB 322 is linked by line 33 to SCB 318, because they are on the same DCB list because SCB 318 controls the CCM 51 space identified in the SIT table at the position identified by block 392. Note that an SCB may have more than one DCB associated with it because an allocation of cache space represented by the SCB, such as SCB 318, can have more than one update, such as the update represented by DCB 322, and the update represented by DCB 328, as in the case of many update write cache misses to the same track. These DCBs are linked to the DCB through the DCB list containing each DCB. An SCB in its corresponding space cannot be de-allocated while a DCB is connected to it. Thus, an SCB and a DCB used with the directory means 310 of the present invention provide a novel way of allocating cache space. Notice in the example of FIG. 17 that SCB 314, SCB 348, and SCB 370 do not appear on a hash conflict list, thus designating that these SCBs do not represent data blocks whose images are in CCM 51. SCB 11, for example, indicates an update for two different track images on the same device. DCB 354 and DCB 364 are linked to SCB 370 by lines 368 and 366 indicating these are all members of the same DCB list. Thus DCB 354 and DCB 364 represent the updates identified by SCB 11. DCB 358 identified by line 356 is linked to DCB 354 on the same track list but each is identified by a different SCB. Each SCB 348 and 370 represents a write miss not pointed to by the SIT table because each was never mapped to cache. DCB 376 represents an update to the same track as DCBs 354 and 358 but according to its position on the list indicates that it is later in time in a preferred embodiment. DCB 376 appearing on the same DCB list as DCB 364 and DCB 354 is thus controlled by SCB 370. DCB 336 is not related to any SCB and this is an exception that can happen with an erase track image command.

Cache Space Reclamation Useful With a Controller Not Having NVS

Referring to FIGS. 1, 3b, 5, 17, and 18, the method of cache space reclamation in the first embodiment of the present invention is shown. Regarding the preferred embodiment of the second embodiment of the present invention, the method steps are carried out by an interaction of microcode in instruction store 67b executed by the cluster controller 68b microprocessor and elements belonging to system 20. Cluster controller 68b is coupled to directory means 310 stored in CCM 51 through cache adapter 71. Further, in a preferred embodiment cluster controller 68B is part of SC 24b. Thus, the method steps described in the flow charts in this document are best carried out by cluster controller 68b in combination with stored information in directory means 310 and enacted on various elements of large distribution processing system 20. Primary emphasis is on the effects of cache management techniques enabled by microcode stored in instruction store 67b on the CSD rack 26 containing a plurality of drawers such as drawer 74 having DCM 86 and HDAs 82, and especially the improved performance of SC 24b and the ability to reclaim cache space in CCM 51 more efficiently. The cache space reclamation begins in step 500. In step 502, microcode stored in instruction store 67b request from a drawer, such as drawer 71, the destaged track list corresponding to those tracks which have been destaged according to an LRU algorithm. This destaged track list is identical in structure and function to that described in conjunction with the first preferred embodiment of the present invention. A check is performed to determine if any track images have entries remaining on the list in step 504. If the answer to this inquiry is "yes" then processing continues to step 506. In step 506, the microcode removes DCB information from directory means 110 for the particular track image corresponding to the entry on the destage track list. Thus space is reclaimed from CCM 51 or 53 for the space corresponding to the DCB information. In effect, this changes the status of the track entry from modified to not modified. In step 508 the microcode in instruction store 67b determines if the image of the track is stored in cache or whether there is simply raw data. In the case of a cache miss the CKD format of the track would be unknown to SC 24b and a true track image would not be stored in cache. In this case, the raw data is considered to be of no value and the CCM space is cleared as shown in step 510. This raw data information would correspond to the information contained in an SCB. However, if the true CKD image of the track was stored in cache it would be retained as shown by the branch path indicated by a yes answer to the inquiry of step 508 and in this case the track entry would be removed from the track list but the image would be retained in cache, as shown in step 512. Thus processing returns back to step 504 until all entries are deleted from the drawer's destaged track list. Finally, when all entries are removed from the destage track list, then processing for cache space reclamation ends as shown in step 516.

Write Process Enabled by Present Invention Useful With a Controller Having no NVS Referring to FIGS. 19, 18, 3B, and 5, a write process in system 20 is carried out in a new fashion enabled by the present invention. Host computer channel 28 initiates a write process which may be in the form of format write as checked for in step 602. A format write includes the CKD format for the track image and thus CCM 51 or 53 space may be allocated based on the information contained in the format write, as shown in step 606. A format write in an IBM 9340 type environment would be of the form WRITE KEY DATA. If the write is not a format write then processing continues to step 604. If the requested data is not in either CCM 51 or 53 then cluster controller 68b will allocate cache space typically in 128K maximum bytes, on an as-needed basis. If, however, the data is found in CCM 51 or 53 then the track image in cache may be updated directly by gaining access through a SCB which controls the cache space storing the track image. The modification is then written to the CCM by using the SCB allocated to that particular cache space as shown in step 610. Immediately upon writing the modification to CCM 51 or 53 the data is written to DCM 86, as shown in step 612. The appropriate DCB information is then stored in directory means 310, as shown in step 614. In step 16, the amount of DCB information corresponding to modified data is compared to a predetermined threshold to see if that predetermined threshold has been exceeded or not. If the predetermined modified data threshold has not been exceeded then a signal to device in status is issued by cluster controller 68b and processing exits as shown in step 626 and 630. If, however, the predetermined modified data threshold has been exceeded then processing continues to step 618. Then according to the cache space reclamation process of the second embodiment of the present invention CCM space is reclaimed. A check is performed in step 620 to see if the modified data threshold is still exceeded. If the cache space reclamation process has reclaimed enough cache space then processing branches to step 626 and the cluster controller 68b enters a device end status. If, however, the data threshold is still exceeded then processing continues to step 622. In this case a commit message is sent from SC 24b to CSD 26 forcing data corresponding to track images according to an LRU priority algorithm are immediately destaged to HDA and a commit reply is returned by CSD 26. In step 624, the directory information corresponding to a DCB for each committed track in directory means 310 is reclaimed from CCM 51 or 53. Processing continues to step 626 where a device in status signal is returned and processing exits in step 630.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawing.

What is claimed is:

1. In a data storage system including a host computer channel coupled to a Storage Controller (SC) having a controller cache memory (CCM) for storing a plurality of data blocks containing records, the data blocks ordered according to a CCM Least Recently Used (LRU) priority list, and further having a non volatile storage (NVS) for storing backup copies of modified data records, wherein the SC is coupled to one or more Cached Storage Drawers (CSDs) each having a plurality of Head Disk Assemblies (HDAs) coupled to at least one drawer cache memory (DCM) for storing a plurality of data blocks ordered according to a DCM LRU priority list, each DCM having a backup power source, and directory means connected to the CCM for enabling the addressing of the CCM and retaining the status of data blocks, a method for transferring data between the host computer channel and the plurality of HDAs responsive to a write operation initiated by the host computer channel, the method comprising the steps of:

destaging a write modified data block from the CCM to the DCM;

responsive to the destaging from the CCM to the DCM, creating status information in the directory means to indicate that the modified data block has been modified and the state of the modified data block is destaged but not committed;

destaging the modified data block from the DCM to a HDA;

responsive to the destaging from the DCM to the HDA, signaling a commit from the CSD to the SC and resetting the status information in the directory means to indicate that the modified data block is not modified;

determining the position of the modified data block in the CCM LRU priority list;

responsive to a determination that the order of the modified data block in the CCM LRU priority list indicates that the modified data block is to be destaged from CCM, adding the modified data block to a CCM destage list in the directory means;

responsive to a determination that the modified data block is on the CCM destage list and the status information in the directory means indicates that the modified track has been destaged but not committed, adding the modified data block to a Not committed list in the directory means;

writing a dummy record into NVS to indicate that the status information in the directory means indicates that the state of the modified data block is destaged but not committed; and freeing the space in NVS allocated to a backup copy of the modified data block.

2. The method of claim 1, further comprising the step of:

determining if the modified data block has been destaged from DCM to an HDA;

responsive to determining the modified data block has been destaged from DCM to an HDA, freeing modified data in CCM by the following steps:

resetting the status information in the directory means to indicate that the modified data block is not modified and the modified data block is no longer in the state of destaged and not committed;

determining if the modified data block is on the Not committed list; and responsive to determining that the modified data block has been added to the Not committed list, placing the modified data block on the CCM LRU priority list in a position indicating that the modified data block is next to be demoted from CCM.

3. The method of claim 1 wherein previously allocated NVS space is reclaimed for use by the following steps of:

determining the content of an NVS data block, and if the data block is the dummy record then issuing a commit request from the SC to the one or more CSDs;

responsive to issuing the commit request in response to the dummy record, destaging the modified data blocks from the DCM to a HDA.

4. The method of claim 3, wherein the content of the NVS data block is determined to contained a modified record then scheduling the modified block to be destaged from CCM.

5. The method of claim 3, wherein if a host computer channel initiated write operation requests to further modify the modified data block after the status information in the directory means indicates that the state of the modified data block is destaged but not committed, then issuing a commit request from the SC to the one or more CSDs; and responsive to issuing the commit request in response to a host computer channel request to further modify the modified data block, destaging the modified data blocks from the DCM to a HDA.

6. The method of claim 5, further comprising the additional steps of:

responsive to the destaging of the modified data blocks from the DCM to the HDA, issuing a commit reply from the one or more CSDs to the SC; and responsive to the commit reply, the SC allowing the host computer channel initiated write operation to proceed.

7. The method of claim 5, further comprising the step of:

responsive to a commit reply from the CSD to the SC for the modified data block, freeing modified data in CCM and in NVS by the following steps:

freeing the dummy record in the NVS;

resetting the status information in the directory means to indicate that the modified data block is not modified and the modified data block state is changed from the state of destaged and not committed; and responsive to determining that the modified data block has been added to the Not committed list, placing the modified data block on the CCM LRU priority list in a position indicating that the modified data block is next to be demoted from CCM.

8. A data storage system comprising:

a host computer channel for receiving requests each specifying addressed data;

a Storage Controller (SC) coupled to the host computer channel for controlling data transfers between the host computer channel and a data storage means;

a controller cache memory (CCM) in the SC for storing a plurality of data blocks ordered according to a CCM Least Recently Used (LRU) priority list;

a non volatile store (NVS) memory for storing backup copies of modified data records;

at least one Cached Storage Drawer (CSD) in the data storage means coupled to the SC for storing data;

a plurality of HDAs in the CSD for storing data;

a Drawer Cache Memory (DCM) in the CSD coupled to the plurality of HDAs for storing a plurality of data blocks ordered according to a DCM LRU priority list, the DCM having a backup power source;

directory means connected to the CCM for enabling the addressing of the CCM and retaining the status of data blocks;

machine executed means coupled to the CCM for transferring data between host computer channel and the plurality of HDAs responsive to a write operation initiated by the host computer channel, the machine executed means including:

means for destaging a write modified data block from the CCM to the DCM;

means responsive to the destaging from the CCM to the DCM, creating status information in the directory means to indicate that the modified data block has been modified and the state of the modified data block is destaged but not committed;

means for destaging the modified data block from the DCM to a HDA;

means responsive to the destaging from the DCM to the HDA, signaling a commit from the CSD to the SC and resetting the status information in the directory means to indicate that the modified data block is not modified;

means for determining the position of the modified data block in the CCM LRU priority list:

means responsive to a determination that the order of the modified data block in the CCM LRU priority list indicates that the modified data block is to be destaged from CCM for adding the modified data block to a CCM destage list in the directory means; and means responsive to a determination that the modified data block is on the CCM destage list and the status information in the directory means indicates that the modified track has been destaged but not committed for adding the modified data block to a Not committed list in the directory means;

means for writing a dummy record into NVS to indicate that the status information in the directory means indicates that the state of the modified data block is destaged but not committed; and means for freeing the space in NVS allocated to a backup copy of the modified data block.

9. The system of claim 8, wherein the machine executed means coupled to the CCM further includes:

means for determining if the modified data block has been destaged from DCM to an HDA;

means responsive to determining the modified data block has been destaged from DCM to an HDA, freeing modified data in CCM by the following steps:

resetting the status information in the directory means to indicate that the modified data block is not modified and the modified data block is no longer in the state of destaged and not committed;

determining if the modified data block is on the Not committed list; and responsive to determining that the modified data block has been added to the Not committed list, placing the modified data block on the CCM LRU priority list in a position indicating that the modified data block is next to be demoted from CCM.

10. The system of claim 8, wherein previously allocated NVS space is reclaimed for use by the machine executed means coupled to the CCM by the following steps of:

determining the content of an NVS data block, and if the data block is the dummy record then issuing a commit request from the SC to the one or more CSDs;

responsive to issuing the commit request in response to the dummy record, destaging the modified data blocks from the DCM to a HDA.

11. The system of claim 10, wherein if the content of the NVS data block is determined to contained a modified record then scheduling the modified block to be destaged from CCM.

12. The system of claim 10, wherein if a host computer channel initiated write operation requests to further modify the modified data block after the status information in the directory means indicates that the state of the modified data block is destaged but not committed, then issuing a commit request from the SC to the one or more CSDs; and responsive to issuing the commit request in response to a host computer channel request to further modify the modified data block, destaging the modified data blocks from the DCM to a HDA.

13. The system of claim 12, wherein the machine executed means coupled to the CCM further includes:

means responsive to the destaging of the modified data blocks from the DCM to the HDA, issuing a commit reply from the one or more CSDs to the SC; and means responsive to the commit reply for causing the SC to allow the host computer channel initiated write operation to proceed.

14. The system of claim 12, wherein the machine executed means coupled to the CCM further includes:

means responsive to a commit reply from the CSD to the SC for the modified data block, freeing modified data in CCM and in NVS by the following steps:

freeing the dummy record in the NVS;

resetting the status information in the directory means to indicate that the modified data block is not modified and the modified data block state is changed from the state of destaged and not committed; and responsive to determining that the modified data block has been added to the Not committed list, placing the modified data block on the CCM LRU priority list in a position indicating that the modified data block is next to be demoted from CCM.

15. The system of claim 12, wherein the machine executed means coupled to the CCM further includes:

means responsive to the destaging of the modified data blocks from the DCM to the HDA, for issuing a commit reply from the one or more CSDs to the SC; and means responsive to the commit reply, for signaling the SC to allow the host computer channel initiated write operation to proceed.

* * * * *